United States Patent
Yamaguchi

(10) Patent No.: US 8,971,401 B2
(45) Date of Patent: Mar. 3, 2015

(54) IMAGE DECODING DEVICE

(75) Inventor: Satoshi Yamaguchi, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 387 days.

(21) Appl. No.: 13/246,503

(22) Filed: Sep. 27, 2011

(65) Prior Publication Data

US 2012/0027087 A1     Feb. 2, 2012

Related U.S. Application Data

(63) Continuation of application No. PCT/JP2009/004761, filed on Sep. 18, 2009.

(30) Foreign Application Priority Data

Mar. 31, 2009    (JP) ................... 2009-087249

(51) Int. Cl.
     *H04B 1/66*       (2006.01)
     *H04N 19/436*     (2014.01)
     *H04N 19/11*      (2014.01)
     *H04N 19/44*      (2014.01)

(52) U.S. Cl.
     CPC ............ *H04N 19/436* (2014.11); *H04N 19/11* (2014.11); *H04N 19/44* (2014.11)
     USPC ....................................................... 375/240

(58) Field of Classification Search
     CPC .................. H04N 19/00533; H04N 19/00042; H04N 19/00521
     USPC ....................................................... 375/240
     See application file for complete search history.

(56) References Cited

U.S. PATENT DOCUMENTS

| | | | |
|---|---|---|---|
| 2002/0031184 A1* | 3/2002 | Iwata | 375/240.23 |
| 2004/0091051 A1* | 5/2004 | Youn | 375/240.25 |
| 2007/0206675 A1* | 9/2007 | Tanaka | 375/240.12 |
| 2007/0253491 A1* | 11/2007 | Ito et al. | 375/240.24 |

(Continued)

FOREIGN PATENT DOCUMENTS

| | | |
|---|---|---|
| JP | 2001-218201 | 8/2001 |
| JP | 2009-246539 | 10/2009 |

(Continued)

OTHER PUBLICATIONS

Puri et. al, Video coding using the H.264/MPEG-4 AVC compression standard, 2004, Science Direct, Signal Processing Image Communication 19, pp. 1-57.*

(Continued)

*Primary Examiner* — Sath V Perungavoor
*Assistant Examiner* — Peter D Le
(74) *Attorney, Agent, or Firm* — McDermott Will & Emery LLP

(57) ABSTRACT

An image decoding device for processing an input bit stream containing encoded data obtained by encoding a moving picture using intra-frame prediction, includes a stream divider configured to divide the input bit stream into a plurality of sub-streams, and a plurality of image decoders each configured to decode the corresponding one of the plurality of sub-streams, thereby outputting images. The stream divider divides the input bit stream so that the plurality of sub-streams each contain the encoded data corresponding to one or more prediction units, where macroblocks of the moving picture each include a plurality of the prediction units for the intra-frame prediction.

14 Claims, 18 Drawing Sheets

(56) References Cited

U.S. PATENT DOCUMENTS

2008/0063082 A1* 3/2008 Watanabe et al. ........ 375/240.23
2008/0069244 A1* 3/2008 Yano ........................ 375/240.24
2009/0034615 A1* 2/2009 Yano ........................ 375/240.12
2010/0195922 A1    8/2010 Amano et al.

FOREIGN PATENT DOCUMENTS

WO    WO 2008/020470 A1    2/2008
WO    WO 2009/142021 A1    11/2009

OTHER PUBLICATIONS

Luis Torres, standards_video_mpeg_english, 2005, pp. 1-30.*
Cor. Meenderinck et al., "Parallel Scalability of Video Decoders: Technical Report," Delft University Computer Engineering Department Technical Report, Jun. 30, 2008.
To-Wei Chen et al., "Architecture Design of H.264/AVC Decoder with Hybrid Task Pipelining for High Definition Videos," Proc. of IEEE Int. Symp. on Circuits and Systems, vol. 3, May 23, 2005, pp. 2931-2934.

* cited by examiner

FIG.16

| Y0 | Y1 |
|----|----|
| Y2 | Y3 |

| Cb0 | Cb1 |
|-----|-----|
| Cb2 | Cb3 |

| Cr0 | Cr1 |
|-----|-----|
| Cr2 | Cr3 |

IMAGE DECODING DEVICE

CROSS-REFERENCE TO RELATED APPLICATIONS

This is a continuation of PCT International Application PCT/JP2009/004761 filed on Sep. 18, 2009, which claims priority to Japanese Patent Application No. 2009-087249 filed on Mar. 31, 2009. The disclosures of these applications including the specifications, the drawings, and the claims are hereby incorporated by reference in their entirety.

BACKGROUND

The present disclosure relates to image decoding devices which decode encoded bit streams.

In recent years, as digital image transfer technology and imaging technology have progressed, high-definition television (HDTV) broadcasting and high-definition (HD) image recording have gained widespread use. There is also an increasing demand for still higher image quality and higher definition, e.g., moving pictures having an image size of 3840×2160 pixels, moving pictures having the 4:2:2 chroma format or 4:4:4, etc. When compressed data of a moving picture having such higher image quality and higher definition is decoded, it is necessary to process data having an amount which is four to eight times as large as that of an conventional HD image (1920×1080 pixels), where the numbers of pixels in these images are simply compared, and therefore, an image decoding device having a huge computational capability is required. Therefore, it is not practical to process such large data using a single image decoding device in terms of cost and power consumption.

In order to solve this problem, Japanese Patent Publication No. 2001-218201 describes a device which uses a plurality of image decoding devices to decode a plurality of slices in a picture in parallel, thereby increasing the processing speed. In Moving Picture Experts Group 2 (MPEG2), an image (picture) includes one or more slices, and each slice includes one macroblock line or less. For example, an HD image (1920×1080 pixels) invariably includes 68 or more slices within the picture. By processing a plurality of slices in parallel using the device of Japanese Patent Publication No. 2001-218201, the processing speed can be increased.

SUMMARY

However, at present, in highly efficient image encoding standards, such as the international telecommunication union-telecommunication sector (ITU-T) H.264, and VC-1, which are becoming mainstream, a picture can also include only one slice unlike MPEG2. The slice size is flexibly defined compared to MPEG2. A slice is allowed to include any number (≥1) of macroblocks. When there are a plurality of slices, the slices may not have the same size.

The device of Japanese Patent Publication No. 2001-218201 decodes a bit stream which is divided into slices in parallel. For example, when a picture includes only one slice, the device cannot perform parallel processing. Even when a picture includes a plurality of slices, then if the slices do not have the same size, e.g., a single specific slice includes 80% of macroblocks included in the picture while the other slices include only a small number of macroblocks, the time required to decode the specific slice is dominant. Therefore, even if a plurality of decoding devices are provided in order to perform parallel processing, the processing speed is not always commensurate with the number of decoding devices.

The present disclosure describes implementations of an image decoding device which performs a decoding process in parallel regardless of the size of each of slices included in a picture.

An example image decoding device for processing an input bit stream containing encoded data obtained by encoding a moving picture using intra-frame prediction, includes a stream divider configured to divide the input bit stream into a plurality of sub-streams, and a plurality of image decoders each configured to decode the corresponding one of the plurality of sub-streams, thereby outputting images. The stream divider divides the input bit stream so that the plurality of sub-streams each contain the encoded data corresponding to one or more prediction units, where macroblocks of the moving picture each include a plurality of the prediction units for the intra-frame prediction.

According to this, macroblocks are each divided into groups each including one or more prediction units (e.g., blocks) included in the macroblock. Therefore, the macroblock can be divided regardless of the size of a slice(s) included in a picture. As a result, an efficient parallel decoding process can be performed regardless of the size of a slice(s) included in a picture.

According to the present disclosure, macroblocks can each be divided regardless of the size of a slice(s) included in a picture. Therefore, an efficient parallel decoding process can be performed. The present disclosure is particularly advantageous when there is not a constraint on the slice size and when a bit stream containing a moving picture having a large image size is decoded.

BRIEF DESCRIPTION OF THE DRAWINGS

FIG. 16 is a diagram showing blocks included in a macroblock, where the chroma format is 4:4:4.

DETAILED DESCRIPTION

Figure 1:
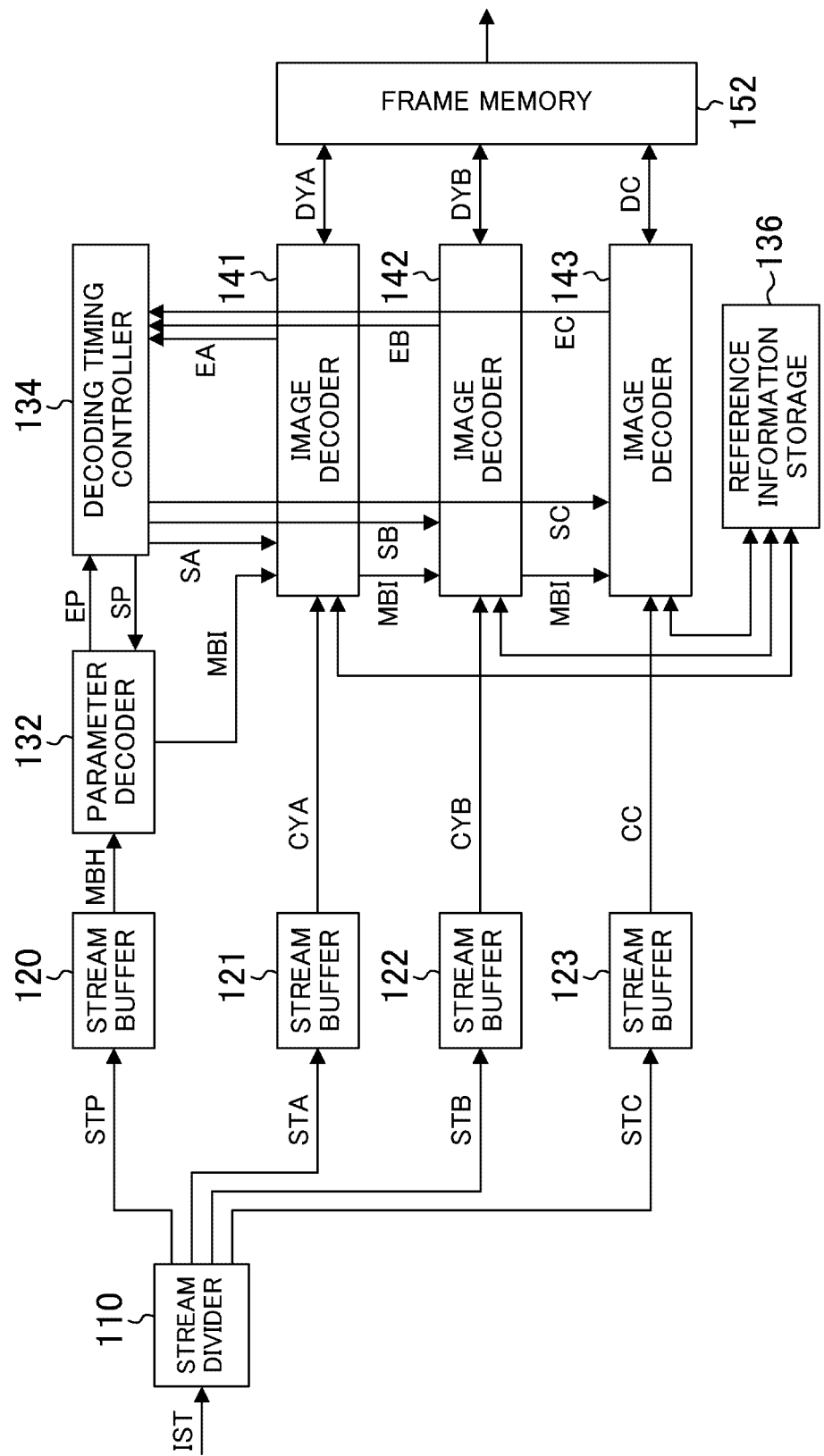
FIG. 1 is a block diagram showing an image decoding device according to an embodiment of the present disclosure.

Embodiments of the present disclosure will be described hereinafter with reference to the accompanying drawings. In the drawings, the same or similar parts are identified by the same reference numerals or by reference numerals having the same last two digits.

Functional blocks described herein may be typically implemented by hardware. For example, functional blocks may be formed as a part of an integrated circuit (IC) on a semiconductor substrate. Here, ICs include large-scale integrated (LSI) circuits, application-specific integrated circuits (ASICs), gate arrays, field programmable gate arrays (FP-GAs), etc. Alternatively, all or a portion of functional blocks may be implemented by software. For example, such functional blocks may be implemented by a program being executed by a processor. In other words, functional blocks described herein may be implemented by hardware, software, or any combination thereof.

FIG. 1 is a block diagram showing an image decoding device according to an embodiment of the present disclosure. The image decoding device of FIG. 1 decodes an input bit stream IST which contains encoded data which is obtained by encoding a moving picture using intra-frame prediction. The image decoding device of FIG. 1 includes a stream divider 110, stream buffers 120, 121, 122, and 123, a parameter decoder 132, a decoding timing controller 134, a reference information storage 136, image decoders 141, 142, and 143, and a frame memory 152. Here, it is assumed that the input bit stream IST is obtained by encoding a moving picture of the 4:2:0 chroma format (Y:Cb (Pb):Cr (Pr)=4:2:0) based on ITU-T H.264 (hereinafter referred to as H.264).

Figure 2:
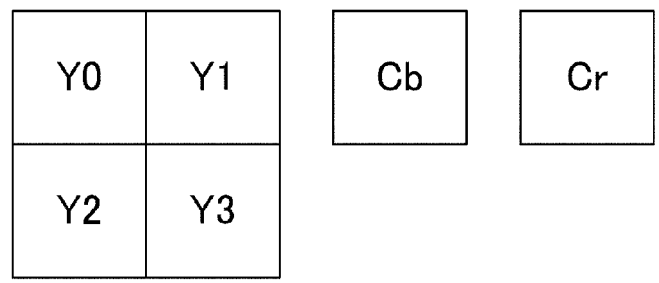
FIG. 2 is a diagram for describing blocks included in a macroblock of the 4:2:0 chroma format.

FIG. 2 is a diagram for describing blocks included in a macroblock of the 4:2:0 chroma format. Each picture included in a moving picture of the input bit stream IST includes a large number of macroblocks. As shown in FIG. 2, it is assumed that each macroblock includes luminance signal blocks Y0, Y1, Y2, and Y3, a blue color difference signal block Cb, and a red color difference signal block Cr. The luminance signal blocks Y0-Y3 are arranged in a matrix of two rows and two columns in the macroblock. The blocks Y0-Y3, Cb, and Cr are each a prediction unit for intra-frame prediction. The macroblock is defined in, for example, H.264.

An example in which each macroblock is assumed to have encoded data corresponding to 16×16 pixels will be described hereinafter. In this case, the blocks Y0-Y3, Cb, and Cr each have encoded data corresponding to 8×8 pixels. The number of pixels to which each macroblock corresponds is not limited to this, and may be 8×8 pixels, for example.

A difference between MPEG2 and H.264, which are moving picture encoding techniques, will be briefly described. In H.264, a compression encoding technique called "intra prediction" is introduced in order to improve compression efficiency by utilizing the correlation between adjacent blocks in a picture, whereby encoding efficiency is improved.

Figure 3:
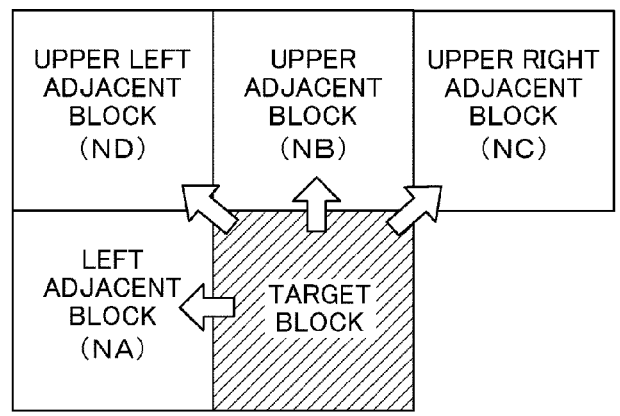
FIG. 3 is a diagram for describing example blocks which are referenced when the image decoding device of FIG. 1 performs decoding.

FIG. 3 is a diagram for describing example blocks which are referenced when the image decoding device of FIG. 1 performs decoding. When the image decoding device of FIG. 1 performs decoding, intra-frame prediction is performed. As the intra-frame prediction, for example, at least one of intra prediction, which predicts pixel values, motion vector prediction, which predicts a motion vector, and DC/AC prediction, which predicts DC components and AC components of DCT coefficients, is performed. Here, intra prediction conforming to H.264 will be described. For example, when images have a frame structure, as shown in FIG. 3 four blocks located on the left, upper left, upper, and upper right sides of a block to be decoded may be referenced within a frame. An optimum prediction direction can be selected for each block to be decoded. In MPEG2, a block in a different frame is referenced, but no block in the same frame is referenced.

Figure 4:
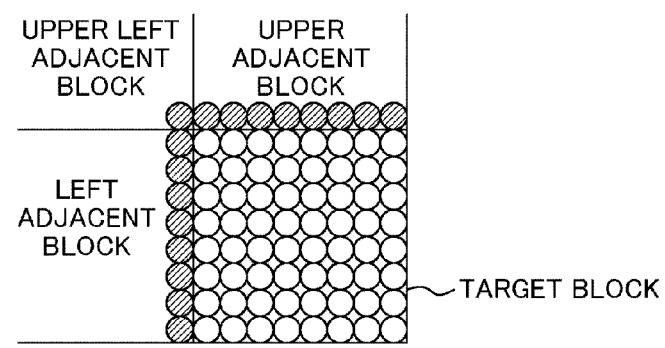
FIG. 4 is a diagram for describing example pixels which are referenced when decoding is performed based on H.264.

FIG. 4 is a diagram for describing example pixels which are referenced when decoding is performed based on H.264. For example, if the intra 8×8 prediction of H.264 is performed on an image having a frame structure, as shown in FIG. 4 information about pixels adjacent to a target block is used as reference information when the target block is decoded.

Figure 5:
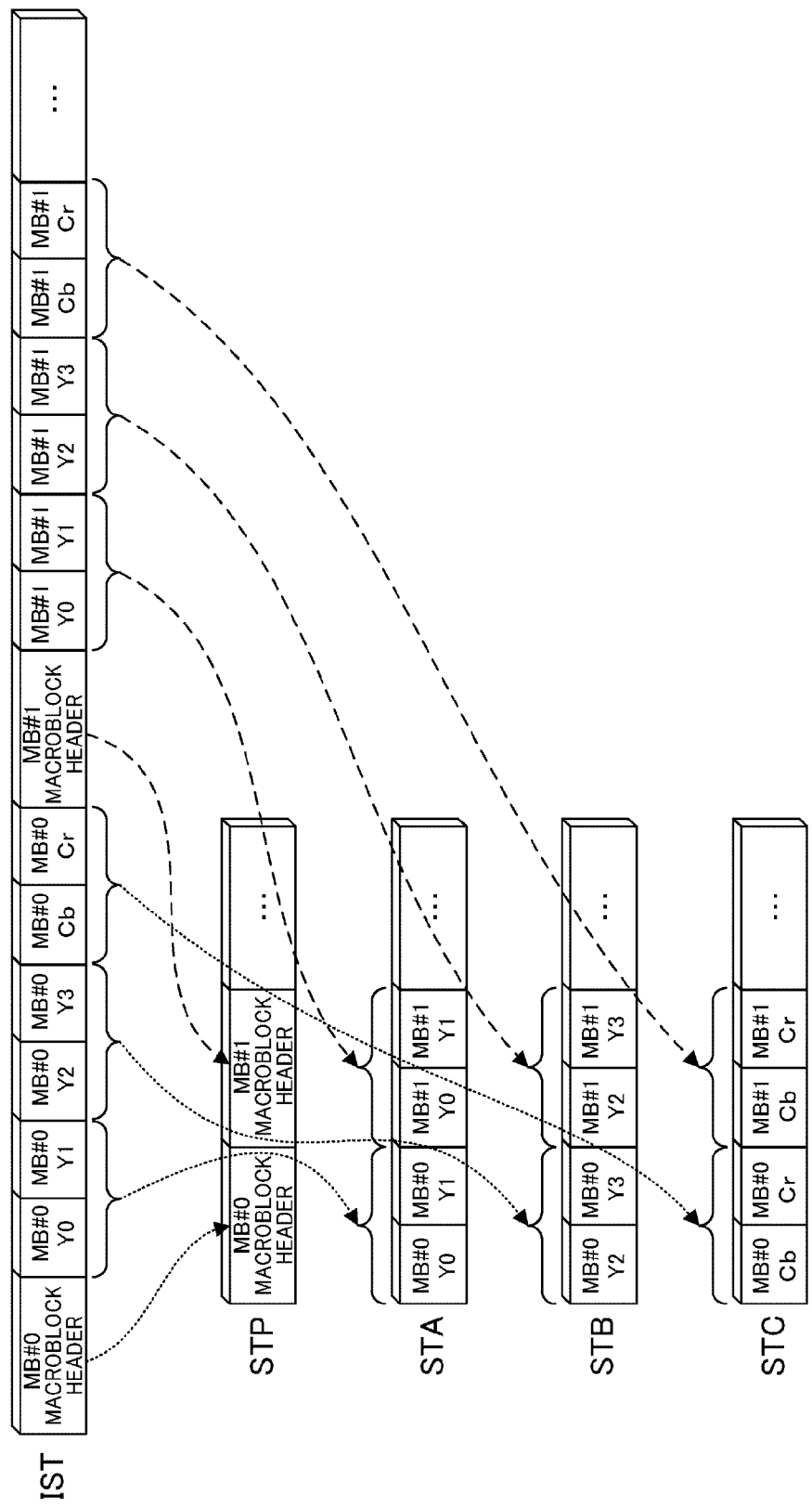
FIG. 5 is a diagram for describing how a bit stream is divided by a stream divider of FIG. 1.

FIG. 5 is a diagram for describing how a bit stream is divided by the stream divider 110 of FIG. 1. Operation of decoding a macroblock layer and lower layers by the image decoding device of FIG. 1 will be described hereinafter.

The stream divider 110 performs bit pattern analysis on the input bit stream IST, and based on the result of the analysis, divides the input bit stream IST into sub-streams STP, STA, STB, and STC. In this case, the stream divider 110 does not perform a decoding process for obtaining pixel data.

The stream divider 110 divides each macroblock (MB) of the input bit stream IST so that the sub-streams STA, STB, and STC each contain encoded data of one or more blocks included in the macroblock. Here, as shown in FIG. 5, the stream divider 110 divides the input bit stream IST so that the sub-stream STP contains a macroblock header, the sub-stream STA contains encoded data of the luminance signal blocks Y0 and Y1, the sub-stream STB contains encoded data of the luminance signal blocks Y2 and Y3, and the sub-stream STC contains encoded data of the color difference signal blocks Cb and Cr.

The stream divider 110 outputs the sub-streams STP, STA, STB, and STC to the stream buffers 120, 121, 122, and 123, respectively. The stream buffers 120, 121, 122, and 123 store the sub-streams STP, STA, STB, and STC, respectively. Therefore, the stream buffer 120 stores encoded data representing coding information of each macroblock. The stream buffer 121 stores encoded data of the blocks Y0 and Y1 of each macroblock. The stream buffer 122 stores encoded data of the blocks Y2 and Y3 of each macroblock. The stream buffer 123 stores encoded data of the blocks Cb and Cr of each macroblock.

The parameter decoder 132 reads a macroblock header MBH from the stream buffer 120 which stores the sub-stream STP, and decodes the macroblock header MBH. The parameter decoder 132 outputs macroblock coding information MBI obtained by decoding the macroblock header MBH to the image decoder 141, and outputs a completion signal EP indicating the completion of the decoding to the decoding timing controller 134.

The decoding timing controller 134 outputs activation signals SP, SA, SB, and SC to the parameter decoder 132 and the image decoders 141-143, respectively, to control the timing of start of decoding processes of the parameter decoder 132 and the image decoders 141-143. In this case, the decoding timing controller 134 causes any of the image decoders 141-143 for which images of adjacent blocks required for a decoding process have already been obtained, to start the decoding process.

The image decoders 141-143, when instructed to start a decoding process by the decoding timing controller 134 using the activation signals SA, SB, and SC, transfers data between each other. The transferred data contains the macroblock coding information MBI. When the image decoders 141-143 perform decoding, intra prediction is performed.

The image decoder 141 is activated in response to the activation signal SA from the decoding timing controller 134, reads encoded data CYA from the stream buffer 121 storing the sub-stream STA, and decodes the encoded data CYA while accessing the frame memory 152 and the reference information storage 136 when necessary. The image decoder 141 stores a resultant decoded image DYA into the frame memory 152, outputs a completion signal EA indicating the completion of the decoding to the decoding timing controller 134, and outputs the macroblock coding information MBI to the image decoder 142.

The image decoder 142 is activated in response to the activation signal SB from the decoding timing controller 134, reads encoded data CYB from the stream buffer 122 storing the sub-stream STB, and decodes the encoded data CYB while accessing the frame memory 152 and the reference information storage 136 when necessary. The image decoder 142 stores a resultant decoded image DYB into the frame memory 152, outputs a completion signal EB indicating the completion of the decoding to the decoding timing controller 134, and outputs the macroblock coding information MBI to the image decoder 143.

The image decoder 143 is activated in response to the activation signal SC from the decoding timing controller 134, reads encoded data CC from the stream buffer 123 storing the sub-stream STC, and decodes the encoded data CC while accessing the frame memory 152 and the reference information storage 136 when necessary. The image decoder 143 stores a resultant decoded image DC into the frame memory 152, and outputs a completion signal EC indicating the completion of the decoding to the decoding timing controller 134.

The reference information storage 136 stores reference information which is required when the image decoders 141-143 decode the encoded data CYA, CYB, and CC. The stored reference information contains an image (intra prediction pixels) and a predicted motion vector which have been obtained as a result of decoding processes performed by the image decoders 141-143. The reference information may be the results of a process at an intermediate stage in the image decoders 141-143 (e.g., an image before being passed to a deblocking filter). The frame memory 152 stores the decoded images DYA, DYB, and DC decoded by the image decoders 141-143.

Figure 6:
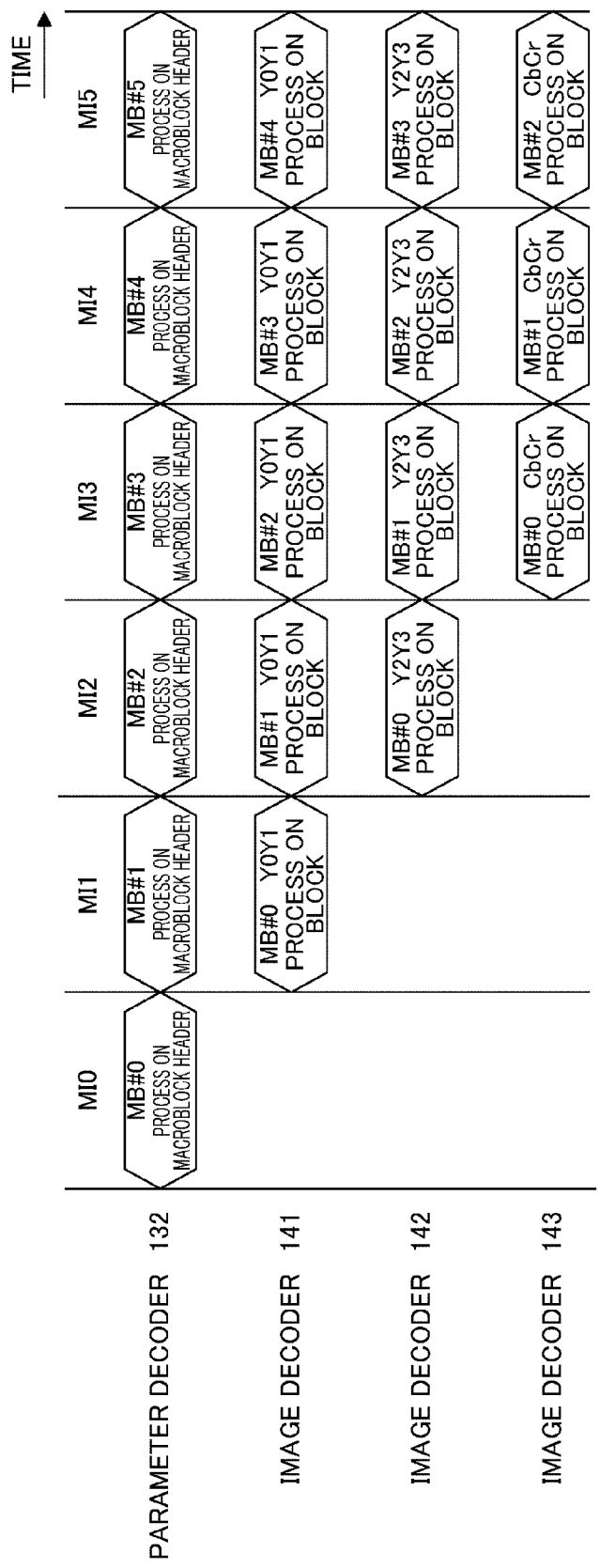
FIG. 6 is a timing chart showing example operation of the image decoding device of FIG. 1.

FIG. 6 is a timing chart of example operation of the image decoding device of FIG. 1. A process during each period will be described in detail with reference to FIG. 6.

<Macroblock Process Period MI0>

When sub-streams are stored in the respective stream buffers 120-123, the decoding timing controller 134 outputs the activation signal SP to the parameter decoder 132. The parameter decoder 132, when receiving the activation signal SP, reads the macroblock header MBH from the stream buffer 120 and decodes the macroblock header MBH to obtain macroblock coding information of a macroblock #0. When the macroblock header MBH is completely decoded, the parameter decoder 132 outputs the completion signal EP to the decoding timing controller 134 to inform the decoding timing controller 134 of the completion of the decoding.

<Macroblock Process Period MI1>

When receiving the completion signal EP, the decoding timing controller 134 recognizes the end of the macroblock process period MI0, and outputs the activation signal SP to activate the parameter decoder 132 in order to obtain coding information of the next macroblock #1. The decoding timing controller 134 also outputs the activation signal SA to the image decoder 141 in order to decode the blocks Y0 and Y1 of the macroblock #0. Similar to the period MI0, the parameter decoder 132, when receiving the activation signal SP, reads the macroblock header MBH from the stream buffer 120, and decodes the macroblock header MBH to obtain macroblock coding information of the macroblock #1. The parameter decoder 132 outputs the completion signal EP to the decoding timing controller 134 to inform the decoding timing controller 134 of the completion of the decoding.

When receiving the activation signal SA, the image decoder 141 receives the macroblock coding information MBI of the macroblock #0 required for a decoding process from the parameter decoder 132, and reads the encoded data CYA from the stream buffer 121. The image decoder 141 decodes the read encoded data using the macroblock coding information MBI of the macroblock #0, and outputs the resultant decoded image DYA of the blocks Y0 and Y1 to the frame memory 152. When the decoding is completed, the image decoder 141 outputs the completion signal EA to the decoding timing controller 134 to inform the decoding timing controller 134 of the completion of the decoding. The image decoder 141 stores a portion of the resultant decoded images of the blocks Y0 and Y1 of the macroblock #0 which is required for decoding processes on the blocks Y2 and Y3 of the macroblock #0, as reference information, into the reference information storage 136.

<Macroblock Process Period MI2>

When receiving the completion signals EP and EA, the decoding timing controller 134 recognizes the end of the macroblock process period MI1, and outputs the activation signal SP to activate the parameter decoder 132 in order to obtain coding information of the next macroblock #2. The decoding timing controller 134 also outputs the activation signal SA to the image decoder 141 in order to decode the blocks Y0 and Y1 of the macroblock #1.

The decoding timing controller 134 also outputs the activation signal SB to the image decoder 142 in order to decode the blocks Y2 and Y3 of the macroblock #0. Similar to the period MI0, the parameter decoder 132, when receiving the activation signal SP, obtains macroblock coding information of the macroblock #2.

The image decoder 141 performs operation which is similar to that performed during the period MI1, except that the macroblock #1 is processed instead of the macroblock #0. The image decoder 141 stores a portion of the resultant decoded images of the blocks Y0 and Y1 of the macroblock #1 which is required for decoding processes on the blocks Y2 and Y3 of the macroblock #1, as reference information, into the reference information storage 136.

Figure 7:
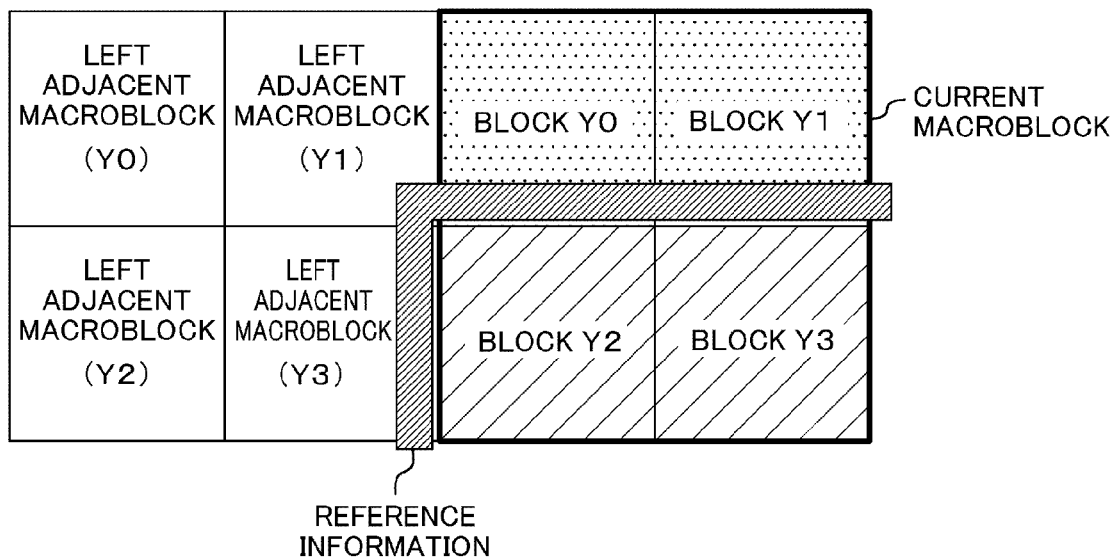
FIG. 7 is a diagram for describing example pixels which are referenced by an image decoder of FIG. 1 which decodes blocks Y2 and Y3.

FIG. 7 is a diagram for describing example pixels which are referenced by the image decoder 142 of FIG. 1 which decodes the blocks Y2 and Y3. It is assumed that each macroblock has four blocks Y0, Y1, Y2, and Y3 as shown in FIG. 7. When the blocks Y2 and Y3 are decoded, the image decoder 142 uses, as reference information, information of pixels adjacent to the blocks Y2 and Y3 as shown in FIG. 7. These pixels are included in:

(1) the blocks Y0 and Y1 belonging to the same macroblock of the blocks Y2 and Y3;

(2) the block Y1 of the left-adjacent macroblock; and (3) the block Y3 of the left-adjacent macroblock.

The image decoder 141 stores the information of pixels in the blocks of (1) and (2) as a result of a decoding process into the reference information storage 136. The information of pixels in the blocks of (1) and (2) is stored before the image decoder 142 processes the blocks Y2 and Y3. The image decoder 142 reads the pixels in the blocks of (1) and (2) from the reference information storage 136 and uses the pixels in the blocks of (1) and (2). The block of (3) is processed by the image decoder 142, and the block of (3) is a result of decoding of the macroblock before the blocks Y2 and Y3 are processed. Therefore, the image decoder 142 uses the information of pixels in the block of (3) without the block of (3) being stored into the reference information storage 136.

When receiving the activation signal SB, the image decoder 142 receives the macroblock coding information MBI of the macroblock #0 required for a decoding process from the image decoder 141, reads the encoded data CYB from the stream buffer 122, and decodes the read encoded data to obtain decoded images of the blocks Y2 and Y3. The decoded image data of the blocks Y0 and Y1 of the macroblock #0 which needs to be referenced in an intra prediction process, is stored as reference information into the reference information storage 136 by the image decoder 141 during the period MI1. The image decoder 142, when performs decoding, reads and processes the decoded images of the blocks Y0 and Y1 of the macroblock #0 and other reference information.

The image decoder 142 outputs the resultant decoded images DYB of the blocks Y2 and Y3 to the frame memory 152. When the decoding is completed, the image decoder 142 outputs the completion signal EB to the decoding timing controller 134 to inform the decoding timing controller 134 of the completion of the decoding.

<Macroblock Process Period MI3>

When receiving the completion signals EP, EA, and EB, the decoding timing controller 134 recognizes the end of the macroblock process period MI2, and outputs the activation signal SP to activate the parameter decoder 132 in order to obtain coding information of the next macroblock #3. The decoding timing controller 134 also outputs the activation signal SA to the image decoder 141 in order to decode the blocks Y0 and Y1 of the macroblock #2.

The decoding timing controller 134 also outputs the activation signal SB to the image decoder 142 in order to decode the blocks Y2 and Y3 of the macroblock #1. The decoding timing controller 134 also outputs the activation signal SC to the image decoder 143 in order to decode the blocks Cb and Cr of the macroblock #0. Similar to the period MI0, the parameter decoder 132, when receiving the activation signal SP, obtains macroblock coding information of the macroblock #3.

The image decoder 141 performs operation which is similar to that performed during the period MI1, except that the macroblock #2 is processed instead of the macroblock #0. The image decoder 141 stores a portion of the resultant decoded images of the blocks Y0 and Y1 of the macroblock #2 which is required for decoding processes on the blocks Y2 and Y3 of the macroblock #2, as reference information, into the reference information storage 136. The image decoder 142 performs operation which is similar to that performed during the period MI2, except that the macroblock #1 is processed instead of the macroblock #0.

When receiving the activation signal SC, the image decoder 143 receives the macroblock coding information MBI of the macroblock #0 required for a decoding process from the image decoder 142, reads the encoded data CC from the stream buffer 123, and decodes the read encoded data to obtain decoded images of the blocks Cb and Cr. The image decoder 143 outputs the resultant decoded images DC of the blocks Cb and Cr to the frame memory 152. When the decoding is completed, the image decoder 143 outputs the completion signal EC to the decoding timing controller 134 to inform the decoding timing controller 134 of the completion of the decoding.

<Macroblock Process Period MI4>

When receiving the completion signals EP, EA, EB, and EC, the decoding timing controller 134 recognizes the end of the macroblock process period MI3, and outputs the activation signals SP, SA, SB, and SC. The image decoders 141, 142, and 143 perform operation which is similar to that performed during the period MI3, except that the image decoders 141, 142, and 143 each process the immediately next macroblock.

During a macroblock process period MI5 and thereafter, a process is repeatedly performed which is similar to that performed during the period MI3, except that the remaining macroblocks are successively processed during successive periods. Thus, the parameter decoder 132 and the image decoders 141-143 process macroblocks in a pipeline fashion.

Note that, in the H.264 standard, there are a skip macroblock, and a block in which the amount of encoded data is zero. It can be determined whether or not there is such a macroblock or block, based on a parameter Coded_Block_Pattern, Mb_Skip_Flag, or Mb_Skip_run. Therefore, the image decoders 141-143 receive Coded_Block_Pattern or skip information as one of parameters, and determine whether or not encoded data of each block is contained in a sub-stream, and when a bit of Coded_Block_Pattern corresponding to the block is zero, the image decoders 141-143 do not perform at least a variable-length decoding process for the block.

The reference information storage 136 may have at least two areas, and the image decoders 141-143 may alternately write data to the two areas of the reference information storage 136 every time a new macroblock is processed. For example, the image decoders 141-143 write the results of processing of the macroblocks #0, #2, #4, and so on to a first area of the reference information storage 136, and write the results of processing of the macroblocks #1, #3, #5, and so on to a second area of the reference information storage 136.

Although an example has been described in which the stream divider 110 divides the input bit stream IST so that the sub-streams STA, STB, and STC each contain two blocks of a macroblock, the input bit stream IST may be divided so that a plurality of sub-streams each contain one or three or more blocks of a macroblock. In this case, stream buffers and image decoders corresponding to the respective sub-streams are used.

As described above, according to the image decoding device of FIG. 1, macroblocks are each divided into groups each including one or more blocks included in the macroblock. Therefore, macroblocks can each be divided regardless of the sizes of slices included in a picture. Therefore, no matter what sizes the slices in a picture have, a decoding process can be efficiently performed in parallel. For example, even when pictures each include a single slice or when pictures each include a plurality of slices having much different sizes, parallel processing can be successfully performed.

An image decoder references the result of decoding performed by another image decoder as reference information which is used in intra-frame prediction, and a plurality of image decoders perform processing in synchronous with each other on a macroblock-by-macroblock basis, whereby substreams can be decoded in parallel. The encoded data of each macroblock is equally divided into three, and therefore, the three image decoders 141-143 have substantially the same processing load.

Therefore, a parallel decoding process can be performed on a bit stream conforming to an image encoding standard, such as H.264 etc., in which there is not a constraint on a slice(s) included in a picture, with low power consumption and low cost.

In the image decoding device of FIG. 1, the image decoders 141-143 are operated in a pipeline fashion. However, the image decoder 143 which processes the blocks Cb and Cr does not need to use the decoding results of the image decoders 141 and 142, and therefore, the image decoder 141 or 142 and the image decoder 143 may process the same macroblock at the same time.

The image decoders 141 and 142 which decode a luminance signal block and the image decoder 143 which decodes a color difference signal block may have similar configurations. Alternatively, the image decoders 141 and 142 may have a configuration specialized in decoding a luminance signal, and the image decoder 143 may have a configuration specialized in decoding a color difference signal.

Figure 8:
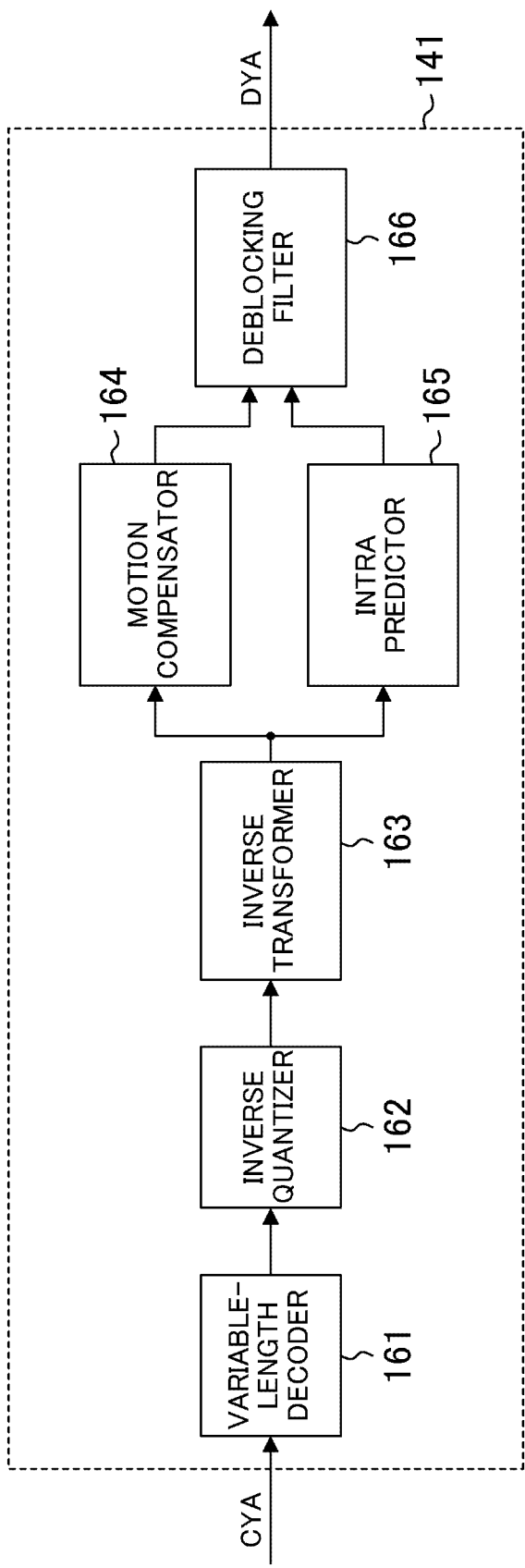
FIG. 8 is a block diagram showing an example configuration of an image decoder of FIG. 1.

FIG. 8 is a block diagram showing an example configuration of the image decoder 141 of FIG. 1. The image decoder 141 includes a variable-length decoder 161, an inverse quantizer 162, an inverse transformer 163, a motion compensator 164, an intra predictor 165, and a deblocking filter 166. The image decoders 142 and 143 of FIG. 1 have a configuration similar to that of the image decoder 141. The image decoders 141-143 operate as described below.

Figure 9:
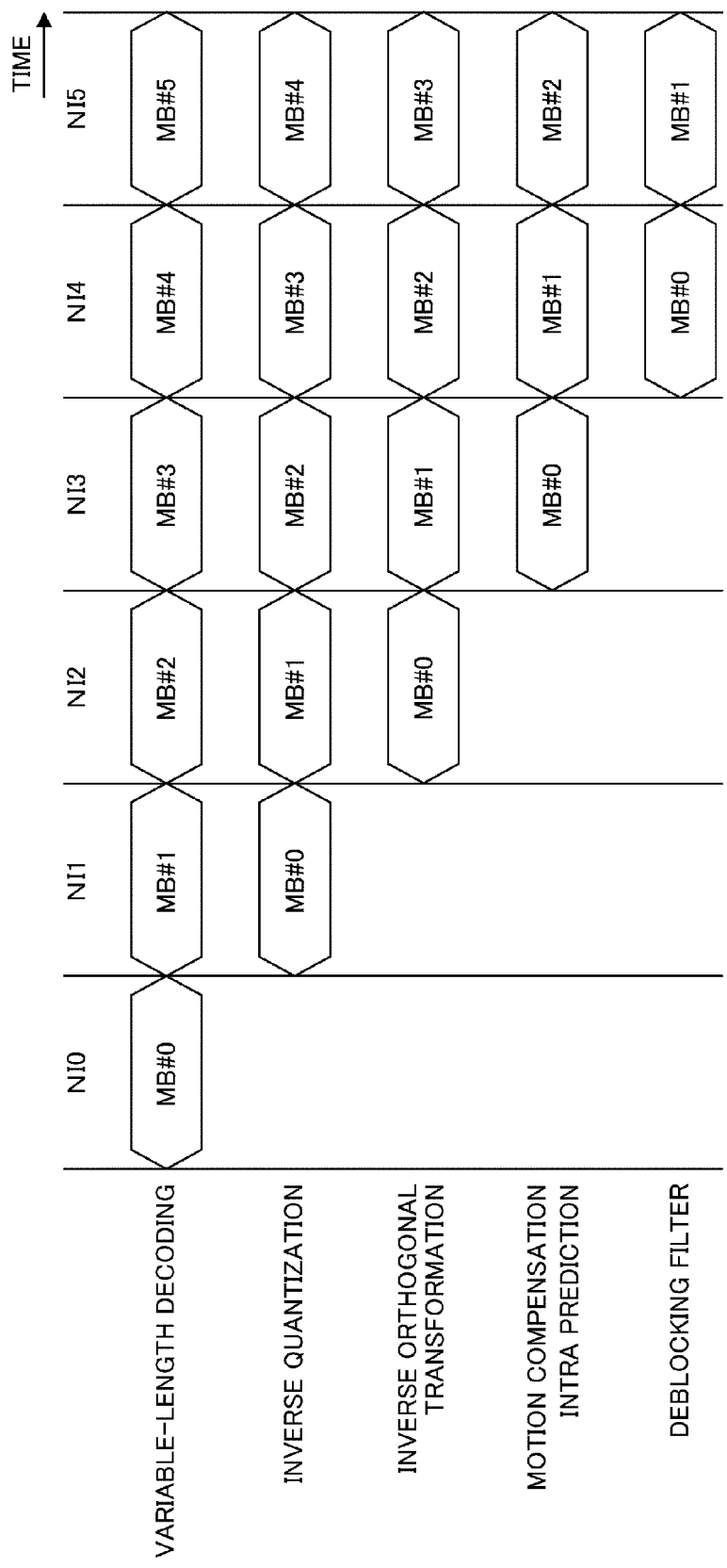
FIG. 9 is a timing chart showing example operation of an image decoder of FIG. 1.

FIG. 9 is a timing chart showing example operation of the image decoder 141 of FIG. 1. The variable-length decoder 161 processes macroblocks #0, #1, #2, #3, #4, and so on during periods NI0, NI1, NI2, NI3, NI4, and so on, respectively, and outputs the results to the inverse quantizer 162. The process on each macroblock includes processes on the six blocks Y0-Y3, Cb, and Cr of FIG. 2.

The inverse quantizer 162 processes the results of the processes which have been performed by the variable-length decoder 161 during the periods NI0, NI1, NI2, NI3, and so on, during periods NI1, NI2, NI3, NI4, and so on, respectively, and outputs the results to the inverse transformer 163. The inverse transformer 163 processes the results of the processes which have been performed by the inverse quantizer 162 during the periods NI1, NI2, NI3, and so on, during periods NI2, NI3, NI4, and so on, respectively, and outputs the results to the motion compensator 164 and the intra predictor 165.

The motion compensator 164 and the intra predictor 165 process the results of the processes which have been performed by the inverse transformer 163 during the periods NI2, NI3, and so on, during periods NI3, NI4, and so on, respectively, and output the results to the deblocking filter 166. The deblocking filter 166 processes the results of the processes which have been performed by the motion compensator 164 and the intra predictor 165 during the periods NI3, NI4, and so on, during periods NI4, NI5, and so on, respectively, and outputs the results.

Thus, the image decoder 141 performs pipeline processing. The image decoders 142 and 143 perform operation similar to that of FIG. 9.

Figure 10:
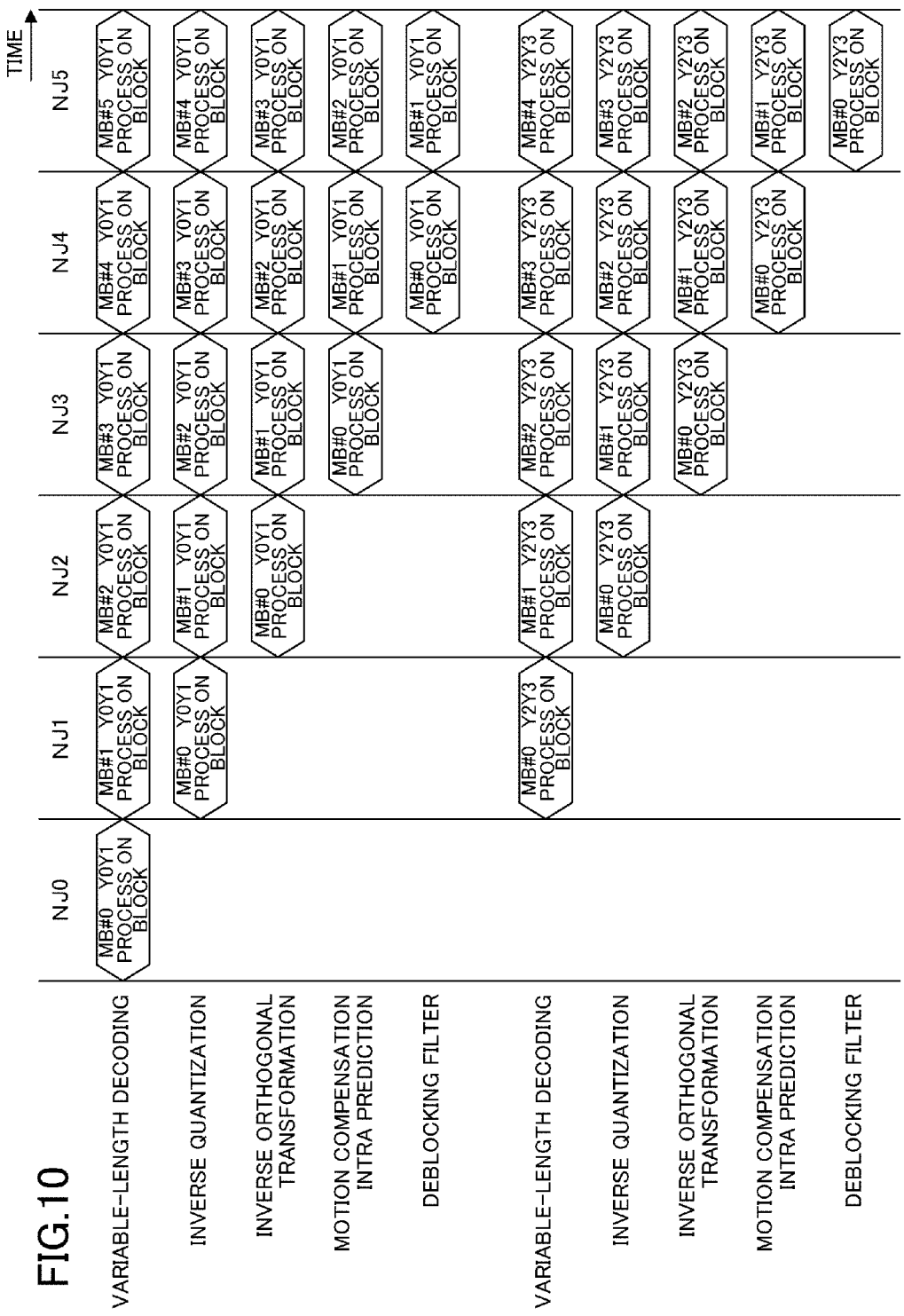
FIG. 10 is a timing chart showing specific example internal operation of image decoders of FIG. 1 which process a luminance signal.

FIG. 10 is a timing chart showing specific example internal operation of the image decoders 141 and 142 of FIG. 1 which process a luminance signal. During a period NJ0, the variable-length decoder 161 of the image decoder 141 reads the encoded data CYA from the stream buffer 121, variable-length decodes the encoded data CYA, and outputs the obtained decoding results of the blocks Y0 and Y1 of the macroblock #0 to the inverse quantizer 162.

During a period NJ1, the variable-length decoder 161 reads the encoded data CYA from the stream buffer 121, variable-length decodes the encoded data CYA, and outputs the obtained decoding results of the blocks Y0 and Y1 of the macroblock #1 to the inverse quantizer 162. The inverse quantizer 162 inversely quantizes the decoding result of the macroblock #0 obtained by the variable-length decoder 161, and outputs the result to the inverse transformer 163.

During a period NJ2, the variable-length decoder 161 reads the encoded data CYA from the stream buffer 121, variable-length decodes the encoded data CYA, and outputs the obtained decoding results of the blocks Y0 and Y1 of the macroblock #2 to the inverse quantizer 162. The inverse quantizer 162 inversely quantizes the decoding result of the macroblock #1 obtained by the variable-length decoder 161, and outputs the result to the inverse transformer 163. The inverse transformer 163 performs inverse orthogonal transformation on the process result of the macroblock #0 obtained by the inverse quantizer 162, and outputs the result to the motion compensator 164 and the intra predictor 165.

During a period NJ3, the variable-length decoder 161 reads the encoded data CYA from the stream buffer 121, variable-length decodes the encoded data CYA, and outputs the obtained decoding results of the blocks Y0 and Y1 of the macroblock #3 to the inverse quantizer 162. The inverse quantizer 162 inversely quantizes the decoding result of the macroblock #2 obtained by the variable-length decoder 161, and outputs the result to the inverse transformer 163. The inverse transformer 163 performs inverse orthogonal transformation on the process result of the macroblock #1 obtained by the inverse quantizer 162, and outputs the result to the motion compensator 164 and the intra predictor 165. The motion compensator 164 and the intra predictor 165 perform motion compensation and intra prediction on the process result of the macroblock #0 obtained by the inverse transformer 163, and outputs the result to the deblocking filter 166.

During a period NJ4, the variable-length decoder 161 reads the encoded data CYA from the stream buffer 121, variable-length decodes the encoded data CYA, and outputs the obtained decoding results of the blocks Y0 and Y1 of the macroblock #4 to the inverse quantizer 162. The inverse quantizer 162 inversely quantizes the decoding result of the macroblock #3 obtained by the variable-length decoder 161, and outputs the result to the inverse transformer 163. The inverse transformer 163 performs inverse orthogonal transformation on the process result of the macroblock #2 obtained by the inverse quantizer 162, and outputs the result to the motion compensator 164 and the intra predictor 165. The motion compensator 164 and the intra predictor 165 perform motion compensation and intra prediction on the process result of the macroblock #1 obtained by the inverse transformer 163, and output the result to the deblocking filter 166. The deblocking filter 166 performs deblocking on the process result of the macroblock #0 obtained by the motion compensator 164 and the intra predictor 165, and outputs the result as the decoding result DYA.

The variable-length decoder, inverse quantizer, inverse transformer, motion compensator, intra predictor, and deblocking filter of the image decoder 142 perform processes similar to those of the image decoder 141 on the blocks Y2 and Y3 of each macroblock. Note that the process of the image decoder 142 starts from the period NJ1.

Thus, if pipeline processing is performed in the image decoders, the length of each stage is reduced compared to the process of FIG. 6, resulting in higher-speed processing.

Figure 11:
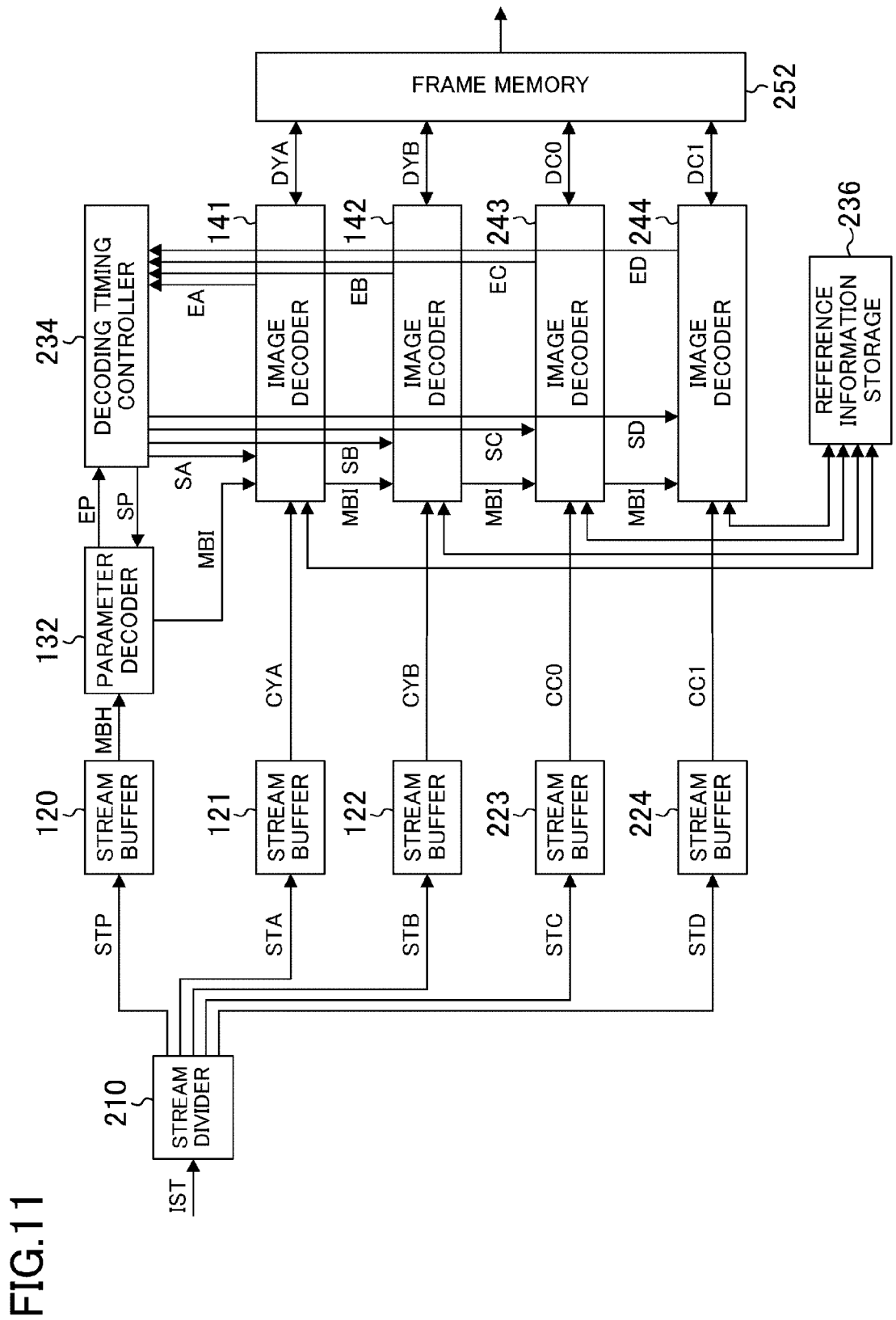
FIG. 11 is a block diagram showing a configuration of a first variation of the image decoding device of FIG. 1.

FIG. 11 is a block diagram showing a configuration of a first variation of the image decoding device of FIG. 1. The image decoding device of FIG. 11 is different from the image decoding device of FIG. 1 in that stream buffers 223 and 224 are provided instead of the stream buffer 123, and image decoders 243 and 244 are provided instead of the image decoder 143. Here, the input bit stream IST is assumed to be a bit stream which is obtained by encoding a moving picture of the 4:2:2 chroma format (Y:Cb (Pb):Cr (Pr)=4:2:2) based on H.264.

Figure 12:
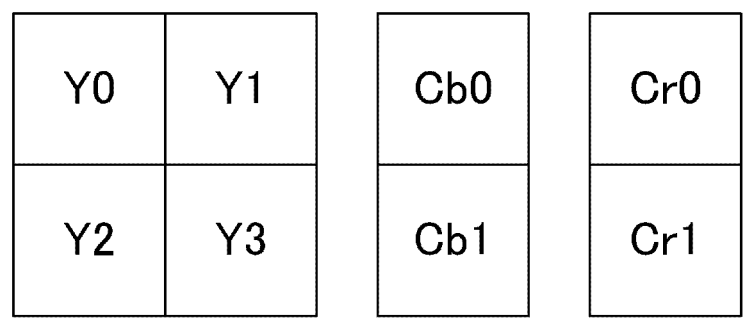
FIG. 12 is a diagram showing blocks included in a macroblock, where the chroma format is 4:2:2.

FIG. 12 is a diagram showing blocks included in a macroblock, where the chroma format is 4:2:2. Each picture included in a moving picture of the input bit stream IST includes a large number of macroblocks. As shown in FIG. 12, each macroblock is assumed to include luminance signal blocks Y0, Y1, Y2, and Y3, blue color difference signal blocks Cb0 and Cb1, and red color difference signal blocks Cr0 and Cr1. The luminance signal blocks Y0-Y3 are arranged in a matrix of two rows and two columns in the macroblock. The blue color difference signal blocks Cb0 and Cb1 are arranged in a matrix of two rows and one column in the macroblock. The red color difference signal blocks Cr0 and Cr1 are arranged in a matrix of two rows and one column in the macroblock. The blocks Y0-Y3, Cb0 and Cb1, and Cr0 and Cr1 are each a prediction unit of intra-frame prediction.

If each macroblock has encoded data corresponding to 16×16 pixels, the blocks Y0-Y3, Cb0 and Cb1, and Cr0 and Cr1 each have encoded data corresponding to 8×8 pixels. The number of pixels to which each macroblock corresponds is not limited to this, and may be 8×8 pixels, for example.

Figure 13:
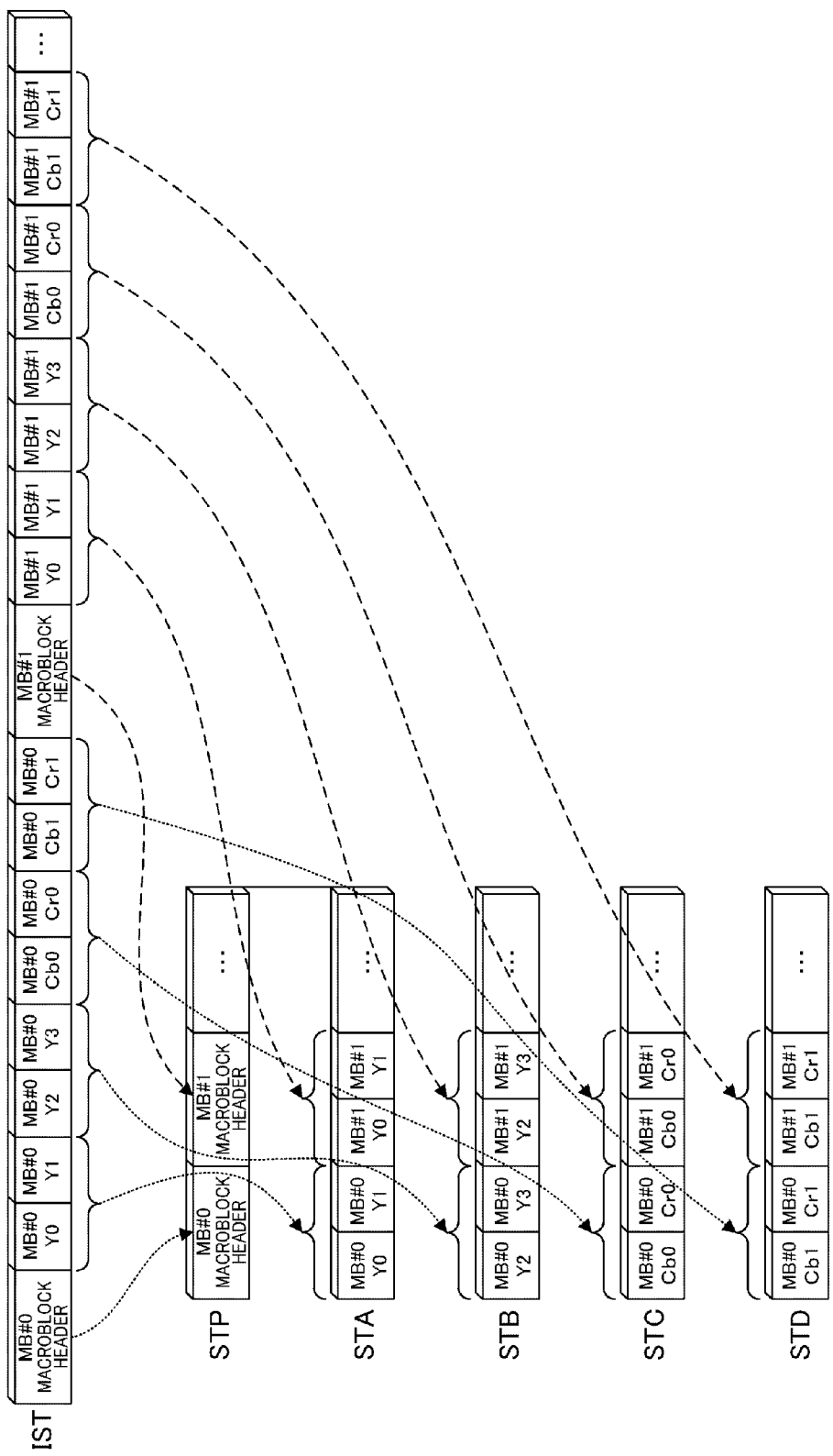
FIG. 13 is a diagram for describing how a bit stream is divided by a stream divider of FIG. 11.

FIG. 13 is a diagram for describing how a bit stream is divided by a stream divider 210 of FIG. 11. Operation of decoding a macroblock layer and lower layers by the image decoding device of FIG. 11 will be described hereinafter.

The stream divider 210 performs bit pattern analysis on the input bit stream IST, and based on the result of the analysis, divides the input bit stream IST into sub-streams STP, STA, STB, STC, and STD. In this case, the stream divider 210 does not perform a decoding process for obtaining pixel data.

The stream divider 210 divides each macroblock of the input bit stream IST so that the sub-streams STA, STB, STC, and STD each contain encoded data of one or more blocks included in the macroblock. Here, as shown in FIG. 13, the stream divider 210 divides the input bit stream IST so that the sub-stream STP contains a macroblock header, the sub-stream STA contains encoded data of the luminance signal blocks Y0 and Y1, the sub-stream STB contains encoded data of the luminance signal blocks Y2 and Y3, the sub-stream STC contains encoded data of the color difference signal blocks Cb0 and Cr0, and the sub-stream STD contains encoded data of the color difference signal blocks Cb1 and Cr1.

The stream divider 210 outputs the sub-streams STP, STA, STB, STC, and STD to the stream buffers 120, 121, 122, 223, and 224, respectively. The stream buffers 120, 121, 122, 223, and 224 store the sub-streams STP, STA, STB, STC, and STD, respectively. Therefore, the stream buffer 120 stores encoded data representing coding information of each macroblock. The stream buffer 121 stores encoded data of the blocks Y0 and Y1 of each macroblock. The stream buffer 122 stores encoded data of the blocks Y2 and Y3 of each macroblock. The stream buffer 223 stores encoded data of the blocks Cb0 and Cr0 of each macroblock. The stream buffer 224 stores encoded data of the blocks Cb1 and Cr1 of each macroblock.

Figure 14:
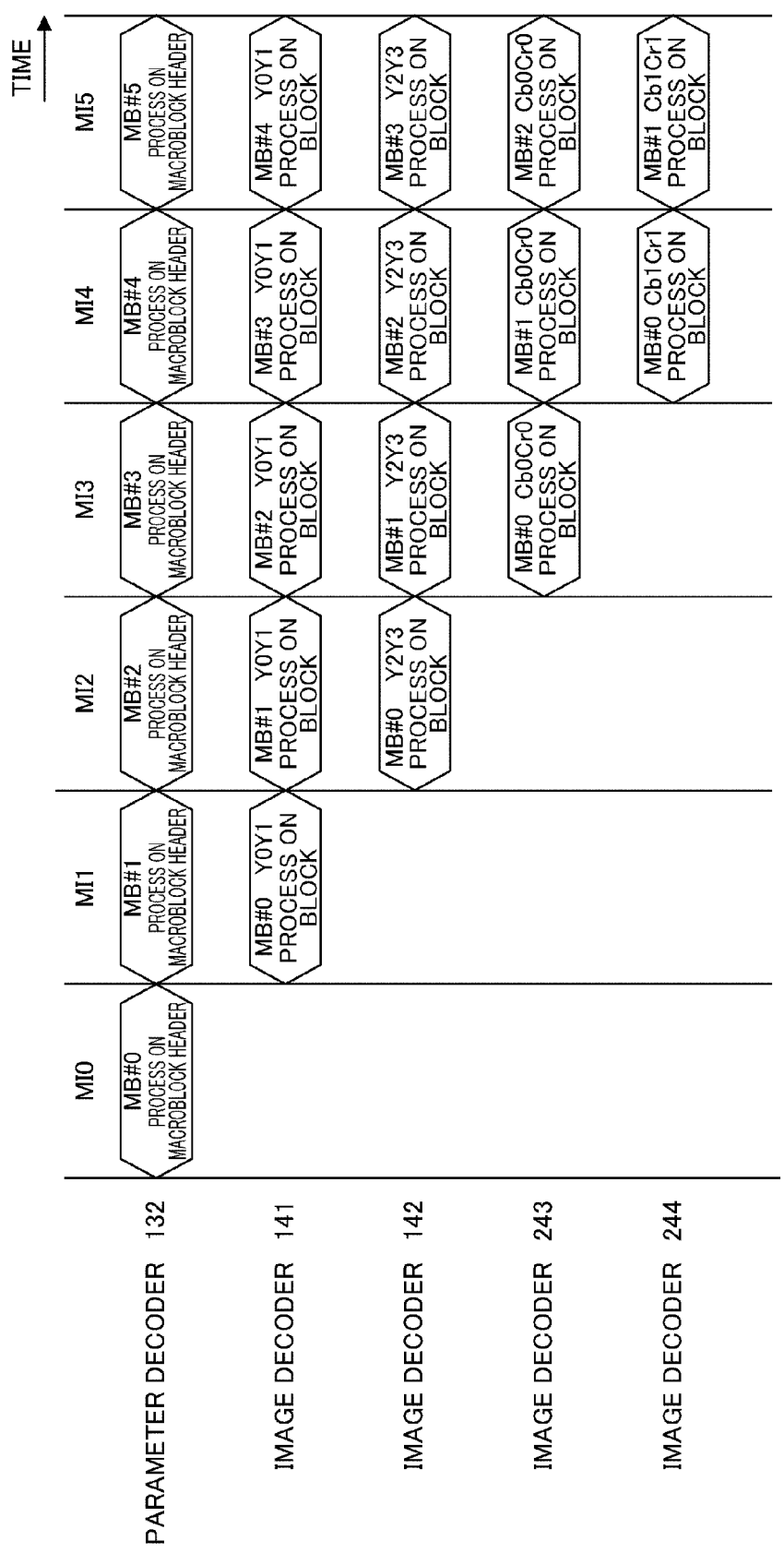
FIG. 14 is a timing chart showing example operation of the image decoding device of FIG. 11.

FIG. 14 is a timing chart of example operation of the image decoding device of FIG. 11. A process during each period will be described in detail with reference to FIG. 14. The macroblock process periods MI0-MI2 are similar to those of FIG. 6 and will not be described.

<Macroblock Process Period MI3>

When receiving the completion signals EP, EA, and EB, a decoding timing controller 234 recognizes the end of the macroblock process period MI2, and outputs an activation signal SP to activate the parameter decoder 132 in order to obtain coding information of the next macroblock #3. The decoding timing controller 234 also outputs an activation signal SA to the image decoder 141 in order to decode the blocks Y0 and Y1 of the macroblock #2.

The decoding timing controller 234 also outputs an activation signal SB to the image decoder 142 in order to decode the blocks Y2 and Y3 of the macroblock #1. The decoding timing controller 234 also outputs an activation signal SC to the image decoder 243 in order to decode the blocks Cb0 and Cr0 of the macroblock #0. Similar to the period MI0, the parameter decoder 132, when receiving the activation signal SP, obtains macroblock coding information of the macroblock #3. The image decoders 141 and 142 are similar to those of FIG. 6 and will not be described.

When receiving the activation signal SC, the image decoder 243 receives the macroblock coding information MBI of the macroblock #0 required for a decoding process from the image decoder 142, reads encoded data CC0 form the stream buffer 223, and decodes the encoded data CC0 to obtain decoded images of the blocks Cb0 and Cr0 of the macroblock #0. The image decoder 243 outputs the resultant decoded images DC0 of the blocks Cb0 and Cr0 to a frame memory 252. When the decoding is completed, the image decoder 243 outputs a completion signal EC to the decoding timing controller 234 to inform the decoding timing controller 234 of the completion of the decoding. The image decoder 243 stores a portion of the resultant decoded images of the blocks Cb0 and Cr0 of the macroblock #0 which is required for decoding processes on the blocks Cb1 and Cr1 of the macroblock #0, as reference information, into a reference information storage 236.

<Macroblock Process Period MI4>

When receiving the completion signals EP, EA, EB, and EC, the decoding timing controller 234 recognizes the end of the macroblock process period MI3, and outputs the activation signals SP, SA, SB, and SC. The image decoders 141, 142, and 243 perform operation which is similar to that performed during the period MI3, except that the image decoders 141, 142, and 243 each process the immediately next macroblock.

The decoding timing controller 234 outputs an activation signal SD to the image decoder 244 in order to decode the blocks Cb1 and Cr1 of the macroblock #0. Similar to the period MI0, the parameter decoder 132, when receiving the activation signal SP, obtains macroblock coding information of the macroblock #4.

When receiving the activation signal SD, the image decoder 244 receives the macroblock coding information MBI of the macroblock #0 required for a decoding process from the image decoder 243, reads encoded data CC1 from the stream buffer 224, and decodes the encoded data CC1 to obtain decoded images of the blocks Cb1 and Cr1 of the macroblock #0. The decoded image data of the blocks Cb0 and Cr0 of the macroblock #0 which needs to be referenced in an intra prediction process has been stored as reference information in the reference information storage 236 since the period MI3. The image decoder 244, when decoding, reads and processes the decoded images of the blocks Cb0 and Cr0 of the macroblock #0 and other reference information.

The image decoder 244 outputs the resultant decoded images DC1 of the blocks Cb1 and Cr1 to the frame memory 252. When the decoding is completed, the image decoder 244 outputs a completion signal ED to the decoding timing controller 234 to inform the decoding timing controller 234 of the completion of the decoding.

<Macroblock Process Period MI5>

When receiving the completion signals EP, EA, EB, EC, and ED, the decoding timing controller 234 recognizes the end of the macroblock process period MI4, and outputs the activation signals SP, SA, SB, SC, and SD. The image decoders 141, 142, 243, and 244 each perform a process which is similar to that performed during the period MI4, except that the image decoders 141, 142, 243, and 244 each process the immediately next macroblock.

During the subsequent macroblock process periods, a process is repeatedly performed which is similar to that performed during the period MI4, except that the remaining macroblocks are successively processed during successive periods. Thus, the parameter decoder 132 and the image decoders 141, 142, 243, and 244 process macroblocks in a pipeline fashion.

As described above, according to the image decoding device of FIG. 11, an image decoder references the result of decoding performed by another image decoder as reference information which is used in intra-frame prediction, and a plurality of image decoders perform processing in synchronous with each other on a macroblock-by-macroblock basis, whereby sub-streams can be decoded in parallel. The encoded data of each macroblock is equally divided into four, and therefore, the four image decoders 141, 142, 243, and 244 have substantially the same processing load.

Note that because the image decoders 243 and 244 do not need to use the decoding results of the image decoders 141 and 142, the image decoders 141 and 243 may process the same macroblock at the same time, and the image decoders 142 and 244 may process the same macroblock at the same time.

Figure 15:
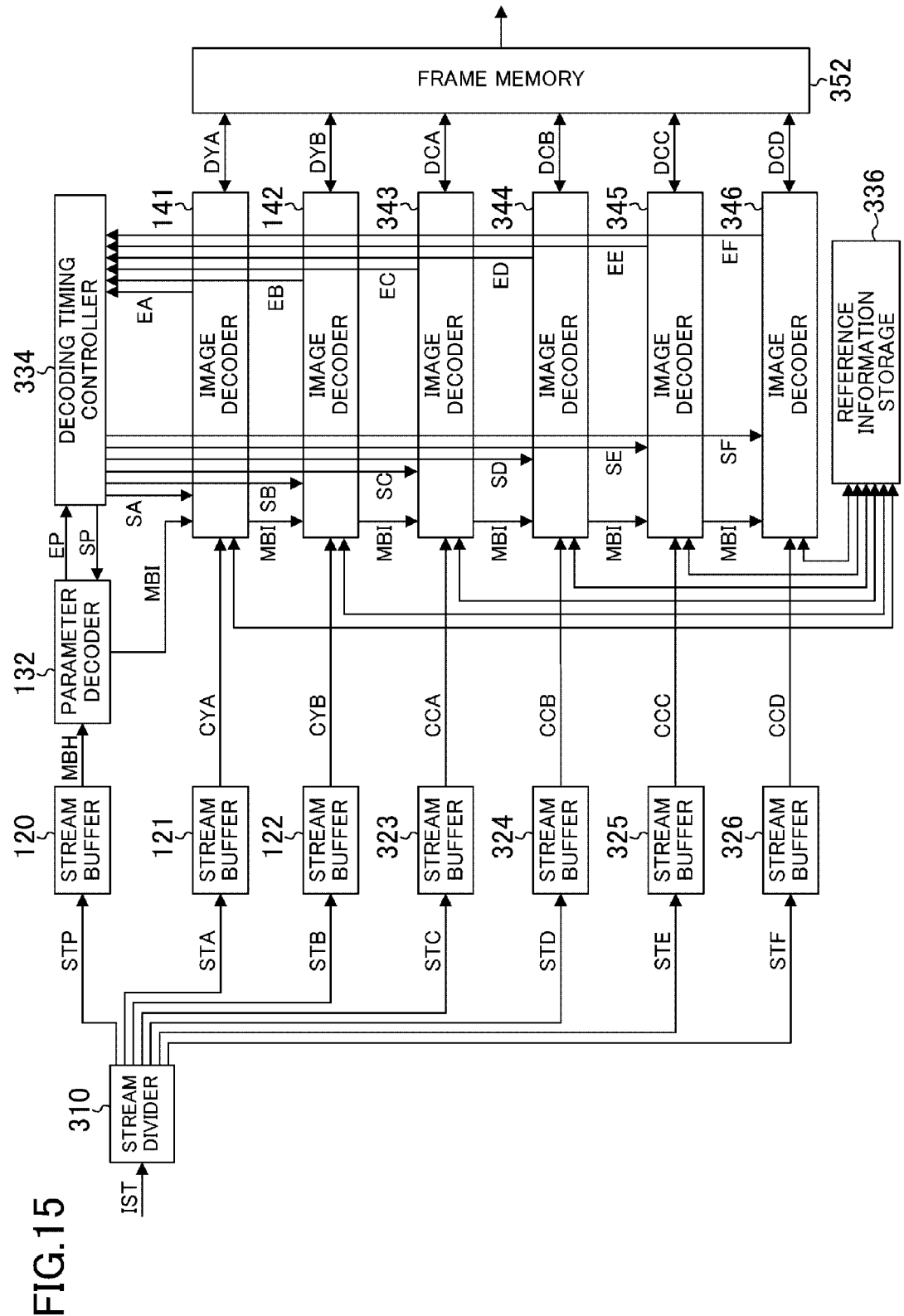
FIG. 15 is a block diagram showing a configuration of a second variation of the image decoding device of FIG. 1.

FIG. 15 is a block diagram showing a configuration of a second variation of the image decoding device of FIG. 1. The image decoding device of FIG. 15 is different from the image decoding device of FIG. 1 in that stream buffers 323, 324, 325, and 326 are provided instead of the stream buffer 123, and image decoders 343, 344, 345, and 346 are provided instead of the image decoder 143. Here, the input bit stream IST is assumed to be a bit stream which is obtained by encoding a moving picture of the 4:4:4 chroma format (Y:Cb (Pb):Cr (Pr)=4:4:4) in conformity with H.264.

Figure 16:
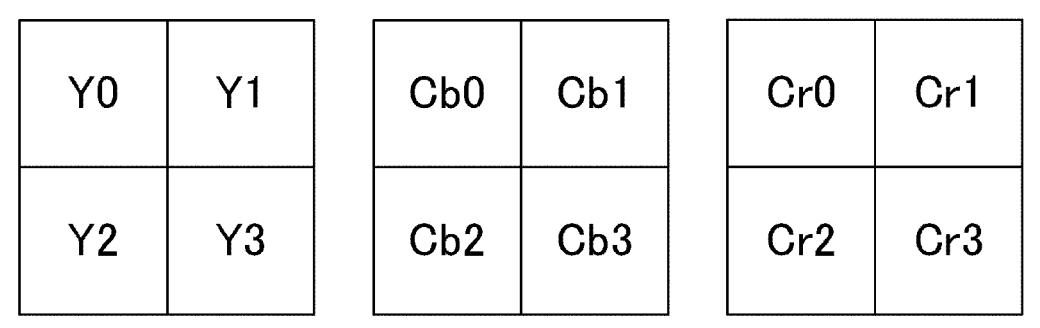

FIG. 16 is a diagram showing blocks included in a macroblock, where the chroma format is 4:4:4. Each picture included in a moving picture of the input bit stream IST includes a large number of macroblocks. As shown in FIG. 16, each macroblock is assumed to include luminance signal blocks Y0, Y1, Y2, and Y3, blue color difference signal blocks Cb0, Cb1, Cb2, and Cb3, and red color difference signal blocks Cr0, Cr1, Cr2, and Cr3. The luminance signal blocks Y0-Y3 are arranged in a matrix of two rows and two columns in the macroblock. The blue color difference signal blocks Cb0-Cb3 are arranged in a matrix of two rows and two columns in the macroblock. The red color difference signal blocks Cr0-Cr3 are arranged in a matrix of two rows and two columns in the macroblock. The blocks Y0-Y3, Cb0-Cb3, and Cr0-Cr3 are each a prediction unit of intra-frame prediction.

If each macroblock has encoded data corresponding to 16×16 pixels, the blocks Y0-Y3, Cb0-Cb3, and Cr0-Cr3 each have encoded data corresponding to 8×8 pixels. The number of pixels to which each macroblock corresponds is not limited to this, and may be 8×8 pixels, for example.

Operation of decoding a macroblock layer and lower layers by the image decoding device of FIG. 15 will be described hereinafter. A stream divider 310 performs bit pattern analysis on the input bit stream IST, and based on the result of the analysis, divides the input bit stream IST into sub-streams STP, STA, STB, STC, STD, STE, and STF. In this case, the stream divider 310 does not perform a decoding process for obtaining pixel data.

The stream divider 310 divides each macroblock of the input bit stream IST so that the sub-streams STA, STB, STC, STD, STE, and STF each contain encoded data of one or more blocks included in the macroblock. Here, the stream divider 310 divides the input bit stream IST so that the sub-stream STP contains a macroblock header, the sub-stream STA contains encoded data of the luminance signal blocks Y0 and Y1, the sub-stream STB contains encoded data of the luminance signal blocks Y2 and Y3, the sub-stream STC contains encoded data of the color difference signal blocks Cb0 and Cb1, the sub-stream STD contains encoded data of the color difference signal blocks Cb2 and Cb3, the sub-stream STE contains encoded data of the color difference signal blocks Cr0 and Cr1, and the sub-stream STF contains encoded data of the color difference signal blocks Cr2 and Cr3.

The stream divider 310 outputs the sub-streams STP, STA, STB, STC, STD, STE, and STF to the stream buffers 120, 121, 122, 323, 324, 325, and 326, respectively. The stream buffers 120-122 and 323-326 store the sub-streams STP, STA, STB, STC, STD, STE, and STF, respectively.

The decoding timing controller 334 has a configuration substantially similar to that of the decoding timing controller 134 of FIG. 1, except that the decoding timing controller 334 outputs activation signals SC, SD, SE, and SF to the image decoders 343-346, respectively, to control the timing of start of decoding processes of the image decoders 343-346. The image decoders 141 and 142 are similar to those of FIG. 1 and will not be described.

The image decoder 343 is activated in response to the activation signal SC from the decoding timing controller 334, reads encoded data CCA from the stream buffer 323 storing the sub-stream STC, and decodes the encoded data CCA while accessing a frame memory 352 and a reference information storage 336 when necessary. The image decoder 343 stores the resultant decoded image DCA into the frame memory 352, outputs a completion signal EC indicating the completion of the decoding to the decoding timing controller 334, and outputs the macroblock coding information MBI to the image decoder 344.

The image decoder 344 is activated in response to the activation signal SD from the decoding timing controller 334, reads encoded data CCB from the stream buffer 324 storing the sub-stream STD, and decodes the encoded data CCB while accessing the frame memory 352 and the reference information storage 336 when necessary. The image decoder 344 stores the resultant decoded image DCB into the frame memory 352, outputs a completion signal ED indicating the completion of the decoding to the decoding timing controller 334, and outputs the macroblock coding information MBI to the image decoder 345.

The image decoder 345 is activated in response to the activation signal SE from the decoding timing controller 334, reads encoded data CCC from the stream buffer 325 storing the sub-stream STE, and decodes the encoded data CCC while accessing the frame memory 352 and the reference information storage 336 when necessary. The image decoder 345 stores the resultant decoded image DCC into the frame memory 352, outputs a completion signal EE indicating the completion of the decoding to the decoding timing controller 334, and outputs the macroblock coding information MBI to the image decoder 346.

The image decoder 346 is activated in response to the activation signal SF from the decoding timing controller 334, reads encoded data CCD from the stream buffer 326 storing the sub-stream STF, and decodes the encoded data CCD while accessing the frame memory 352 and the reference information storage 336 when necessary. The image decoder 346 stores the resultant decoded image DCD into the frame memory 352, and outputs a completion signal EF indicating the completion of the decoding to the decoding timing controller 334.

Note that because the image decoders 343-346 do not need to use the decoding results of the image decoders 141 and 142, the image decoder 141 and the image decoders 343 and 345 may process the same macroblock at the same time, and the image decoder 142 and the image decoders 344 and 346 may process the same macroblock at the same time.

According to the image decoding device of FIG. 15, an image decoder references the result of decoding performed by another image decoder as reference information which is used in intra-frame prediction, and a plurality of image decoders perform processing in synchronous with each other on a macroblock-by-macroblock basis, whereby sub-streams can be decoded in parallel. The encoded data of each macroblock is equally divided into six, and therefore, the six image decoders 141, 142, and 343-346 have substantially the same processing load.

Figure 17:
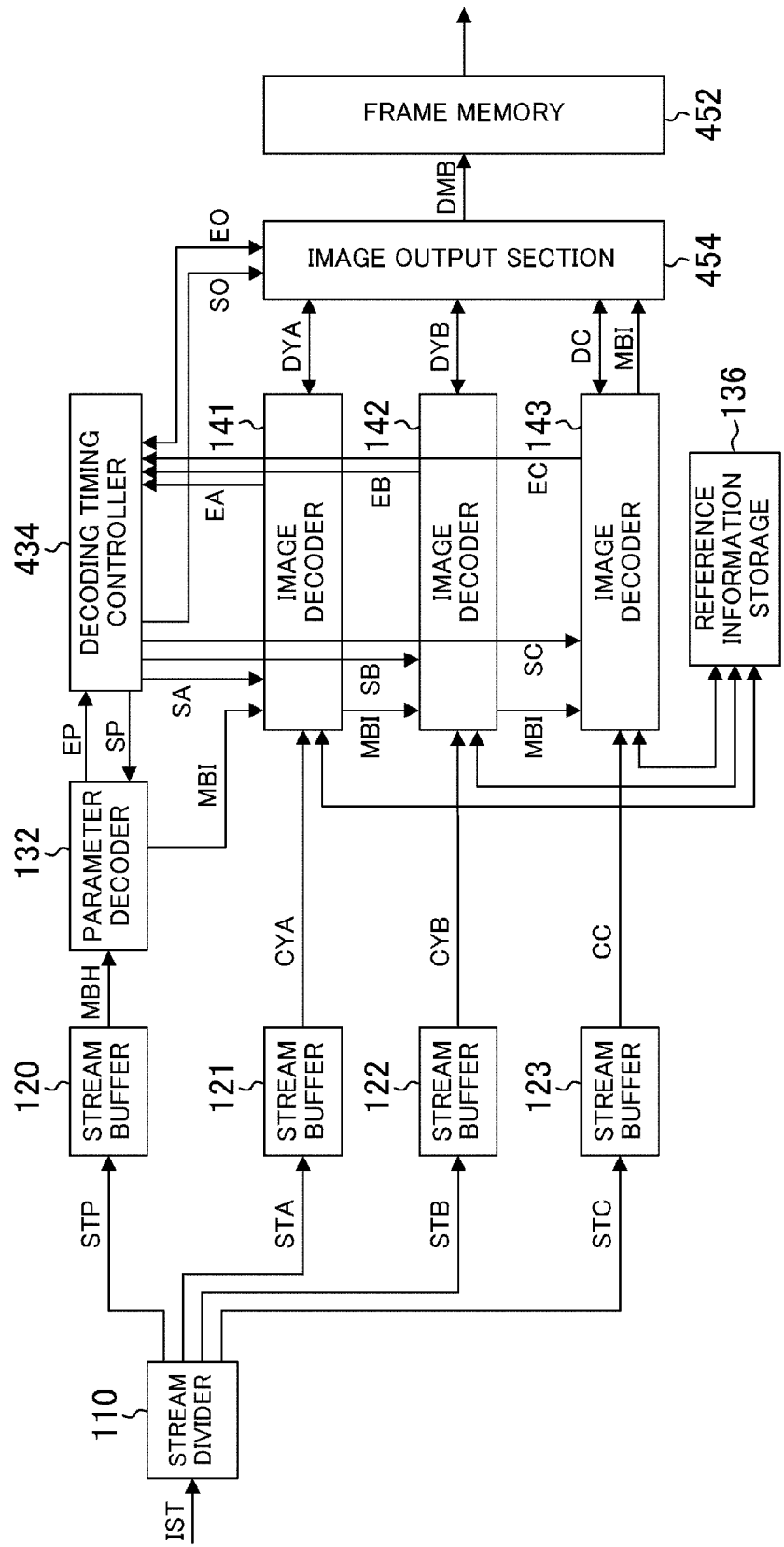
FIG. 17 is a block diagram showing a configuration of a third variation of the image decoding device of FIG. 1.

FIG. 17 is a block diagram showing a configuration of a third variation of the image decoding device of FIG. 1. The image decoding device of FIG. 17 is different from the image decoding device of FIG. 1 in that an image output section 454 is further provided. The image output section 454, when storing images decoded by the image decoders 141-143, i.e., decoded images of all blocks (here, blocks Y0-Y3, Cb, and Cr) of a macroblock, outputs decoded images of the macroblock.

Figure 18:
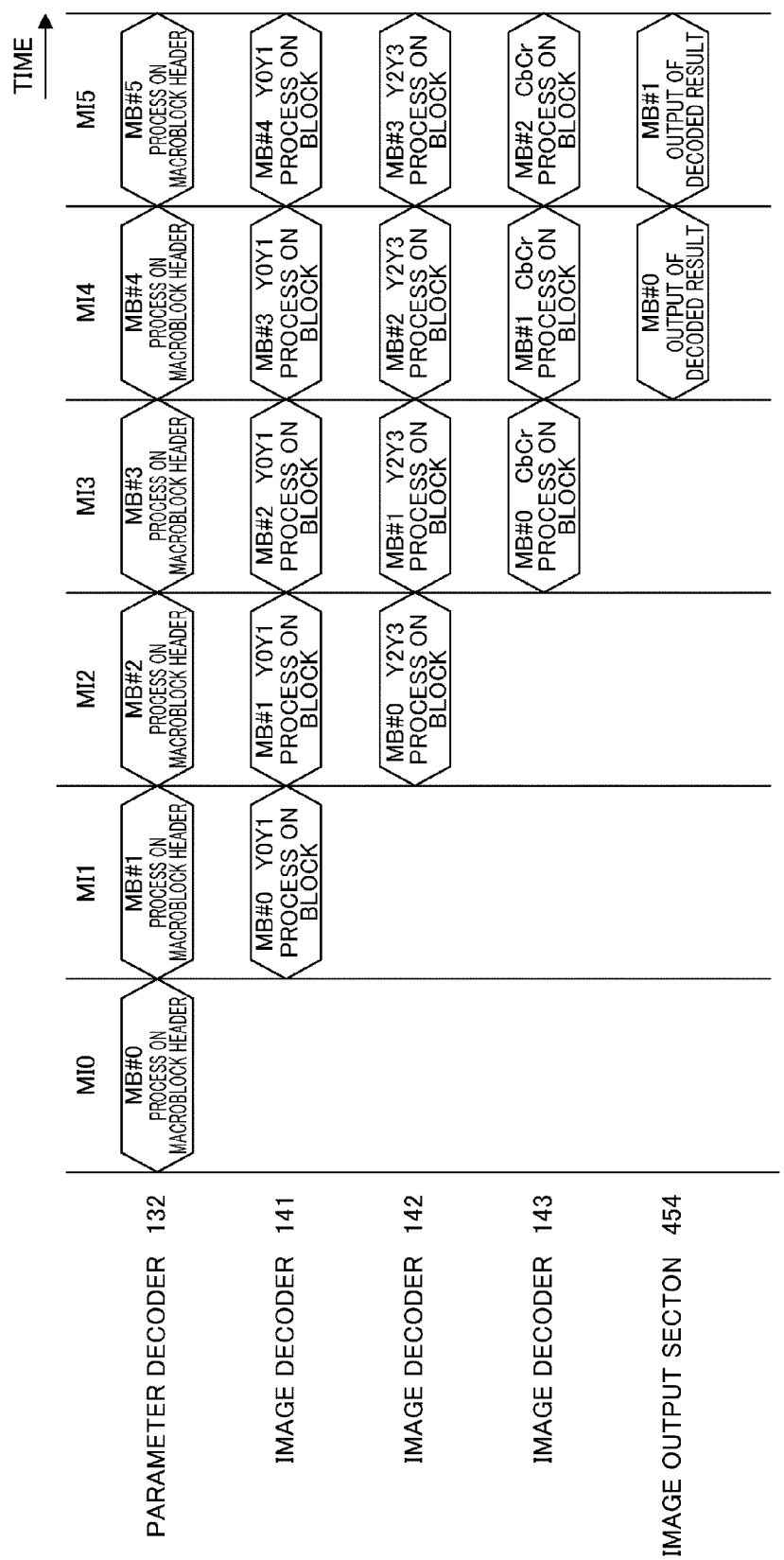
FIG. 18 is a timing chart showing example operation of the image decoding device of FIG. 17.

FIG. 18 is a timing chart showing example operation of the image decoding device of FIG. 17. Operation during each period will be described in detail with reference to FIG. 17.

<Macroblock Process Period MI0>

The operation is similar to that of FIG. 6.

<Macroblock Process Period MI1>

The image decoder 141 obtains and outputs decoded images DYA of the blocks Y0 and Y1 to the image output section 454 instead of a frame memory 452. The image output section 454 stores the decoded image DYA. This is similarly performed during the subsequent periods. The other points are similar to those of FIG. 6.

<Macroblock Process Period MI2>

The image decoder 142 obtains and outputs decoded images DYB of the blocks Y2 and Y3 to the image output section 454 instead of the frame memory 452. This is similarly performed during the subsequent periods. The other points are similar to those of FIG. 6.

<Macroblock Process Period MI3>

The image decoder 143 obtains and outputs decoded images DC of the blocks Cb and Cr to the image output section 454 instead of the frame memory 452. This is similarly performed during the subsequent periods. The other points are similar to those of FIG. 6.

<Macroblock Process Period MI4>

After decoded images of all blocks included in the macroblock #0 are stored into the image output section 454, a decoding timing controller 434 receives the completion signals EP, EA, EB, and EC. As a result, the decoding timing controller 434 recognizes the end of the macroblock process period MI3, and outputs activation signals SP, SA, SB, SC, and SO.

The image output section 454, when receiving the activation signal SO, receives the macroblock coding information MBI of the macroblock #0 required for a decoding process from the image decoder 143, and outputs decoded images DMB of all blocks included in the macroblock #0 to the frame memory 452 on a macroblock-by-macroblock basis. The frame memory 452 stores the decoded images DMB. After the outputting is completed, the image output section 454 outputs a completion signal EO to the decoding timing controller 434 to inform the decoding timing controller 434 of the completion of the outputting. Thereafter, the image output section 454 stores the decoded images DYA, DYB, and DC obtained by the image decoders 141-143.

During a macroblock process period MI5 and thereafter, a process is repeatedly performed which is similar to that performed during the period MI4, except that the remaining macroblocks are successively processed during successive periods.

According to the image decoding device of FIG. 17, the image output section 454 is provided which simultaneously outputs the decoded images of the image decoders 141-143 which perform decoding processes in parallel, and therefore, the entire data of one macroblock can be transferred at a time. Instead of transferring a relatively small amount of data a plurality of times, all the data is transferred at a time. As a result, the overhead of the transfer can be reduced, and an increase in the required bandwidth can be reduced.

Figure 19:
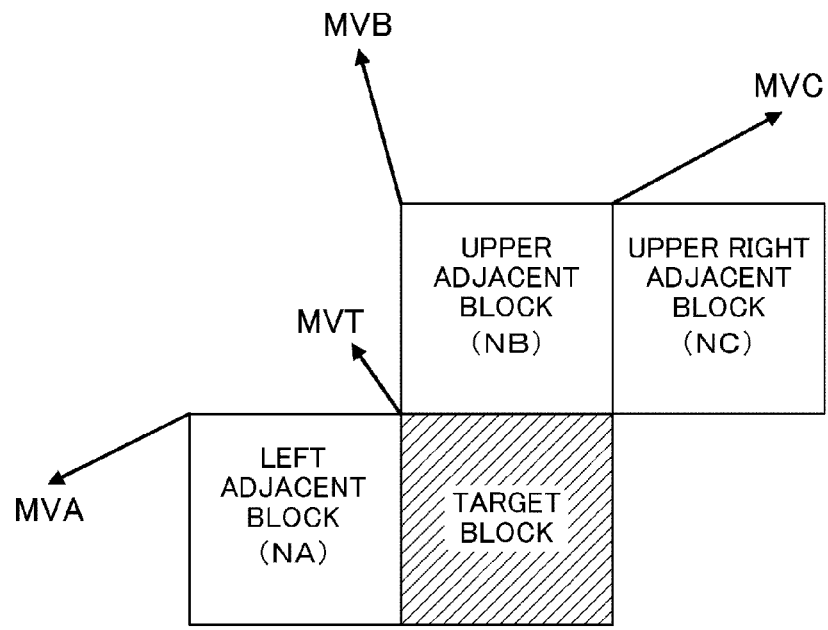
FIG. 19 is a diagram for describing example blocks which are referenced in motion vector prediction.

Next, motion vector prediction will be described. FIG. 19 is a diagram for describing example blocks which are referenced in motion vector prediction. For example, when images have a frame structure, as shown in FIG. 19 three blocks located on the left, upper, and upper right sides of a block to be decoded may be referenced within a picture. If there is not a block on the upper right side, a block on the upper left side is referenced (see FIG. 3).

The image decoders 141-143 etc. calculate a motion vector MVT of a block to be decoded, based on reference information stored in the reference information storage 136, such as a motion vector MVA of a block NA, a motion vector MVB of a block NB, and a motion vector MVC of a block NC, and outputs the calculated motion vector MVT to the reference information storage 136, the frame memory 152, etc. The reference information storage 136 stores the motion vector MVT as reference information for motion vector prediction of other blocks.

Figure 20:
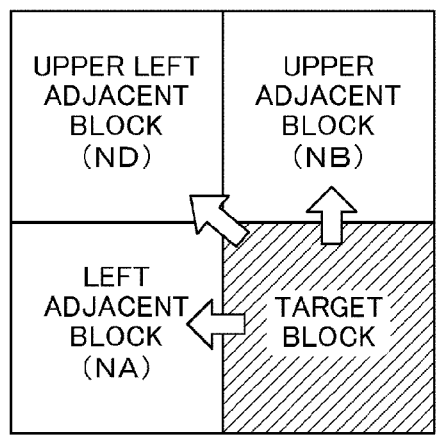
FIG. 20 is a diagram for describing example blocks which are referenced in DC/AC prediction.

Next, DC/AC prediction will be described. FIG. 20 is a diagram for describing example blocks which are referenced in DC/AC prediction. For example, when images have a frame structure, as shown in FIG. 20 three blocks located on the left, upper, and upper left sides of a block to be decoded may be referenced within a picture (see FIG. 20).

Figure 21A:
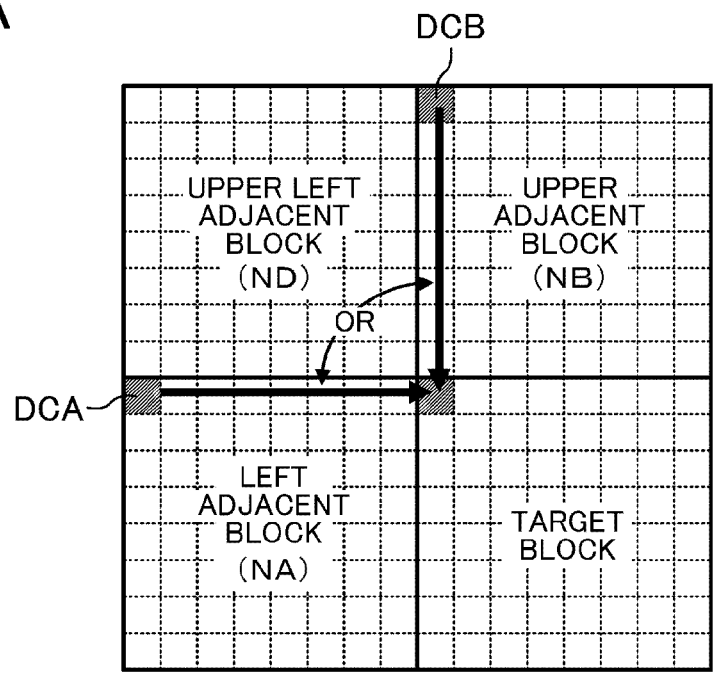
FIG. 21A is a diagram for describing DC prediction.
Figure 21B:
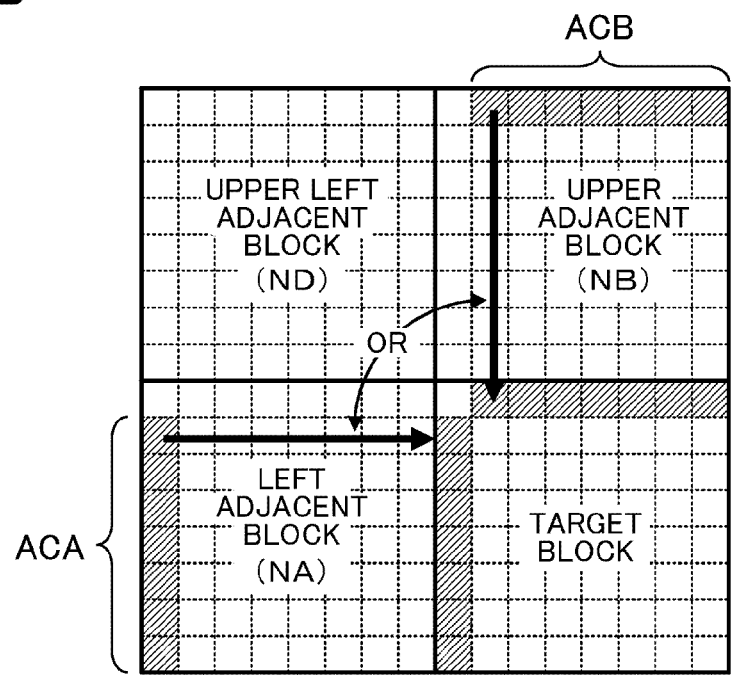
FIG. 21B is a diagram for describing AC prediction.

FIG. 21A is a diagram for describing DC prediction. A DCT coefficient DCA of a block NA and a DCT coefficient DCB of a block NB are DC components. The image decoders 141-143 etc. use the DCT coefficient DCA or DCB as a corresponding DCT coefficient (DC component) of a block to be decoded. FIG. 21B is a diagram for describing AC prediction. DCT coefficients ACA in the leftmost column of the block NA and DCT coefficients ACB of the uppermost row of the block NB are AC components. The image decoders 141-143 etc. use the DCT coefficients ACA as DCT coefficients of a corresponding column of the block to be decoded, or the DCT coefficients ACB as DCT coefficients of a corresponding row of the block to be decoded. The reference information storage 136 stores the DCT coefficients of the block to be decoded as reference information for DC/AC prediction of other blocks.

While, in the above embodiments, an example in which macroblocks each include luminance signal blocks Y0-Y3 and color difference signal blocks (Cb and Cr etc.) has been described, each macroblock may include blocks of signals indicating red (R), green (G), and blue (B), or alternatively, blocks of signals indicating a hue (H), a saturation (S), and a value (V).

While, in the above embodiments, an example in which macroblocks are each divided into groups each including two blocks (e.g., blocks Y0 and Y1, blocks Y2 and Y3, or blocks Cb and Cr), each macroblock may be divided into groups each including one block, or groups each including one or more sub-blocks included in a block. If each macroblock includes four or more blocks, the macroblock may be divided into groups each including three or more blocks. For example, if macroblocks each include 16 blocks (or 16 sub-blocks), each macroblock may be divided into groups each including 4 blocks (or 4 sub-blocks).

While an example in which the blocks Y0-Y3, Cb0-Cb3, and Cr0-Cr3 all have encoded data corresponding to 8×8 pixels, each block may include encoded data corresponding to, for example, 16 pixels in the vertical direction×8 pixels in the horizontal direction, 8 pixels in the vertical direction×16 pixels in the horizontal direction, 8 pixels in the vertical direction×4 pixels in the horizontal direction, 4 pixels in the vertical direction×8 pixels in the horizontal direction, or 4×4 pixels.

The many features and advantages of the present disclosure are apparent from the written description, and thus, it is intended by the appended claims to cover all such features and advantages of the present disclosure. Further, since numerous modifications and changes will readily occur to those skilled in the art, it is not desired to limit the present disclosure to the exact configurations and operations as illustrated and described. Hence, all suitable modifications and equivalents may be contemplated as falling within the scope of the present disclosure.

As described above, according to the embodiments of the present disclosure, macroblocks can each be divided regardless of the size of a slice(s) included in a picture. Therefore, the present disclosure is useful for an image decoding device etc. The present disclosure is also useful for an optical disk reproduction device, an optical disk recording device, a digital television receiver, a camcorder, a mobile telephone etc.

What is claimed is:

1. An image decoding device for processing an input bit stream containing encoded data obtained by encoding a moving picture using intra-frame prediction, where each of the macroblocks of the moving picture includes a plurality of prediction units for the intra-frame prediction, the image decoding device comprising:
a stream divider configured to divide the input bit stream into a plurality of sub-streams; and
a plurality of image decoders each configured to decode the corresponding one of the plurality of sub-streams, thereby outputting images,
wherein the stream divider divides the encoded data corresponding to one of the macroblocks into groups each made up of at least one of the prediction units and outputs the sub-streams so that the groups are included in different ones of the sub-streams, each of the sub-streams includes prediction units from different macroblocks.

2. The image decoding device of claim 1, wherein at least one of the plurality of image decoders performs decoding with reference to a result of processing by another one of the plurality of image decoders.

3. The image decoding device of claim 2, further comprising:
a decoding timing controller configured to control timing of decoding processes of the plurality of image decoders.

4. The image decoding device of claim 3, wherein the plurality of image decoders, when instructed to start processing by the decoding timing controller, transfer data between the plurality of image decoders.

5. The image decoding device of claim 4, wherein the data transferred between the plurality of image decoders contains macroblock coding information.

6. The image decoding device of claim 2, further comprising:
a reference information storage configured to store results of processing by the plurality of image decoders,
wherein at least one of the plurality of image decoders reads, from the reference information storage, the result of processing by the another one of the plurality of image decoders, and uses the result of processing.

7. The image decoding device of claim 2, wherein
the reference information storage has at least two areas,
the plurality of image decoders alternately write data to the two areas of the reference information storage every time one of the macroblocks is processed.

8. The image decoding device of claim 1, further comprising:
an image output section configured to store the images obtained by decoding all prediction units included in each of the macroblocks, and to subsequently output the images.

9. The image decoding device of claim 1, wherein the stream divider analyzes the input bit stream, and based on a result of the analysis, divides the input bit stream without decoding the input bit stream.

10. The image decoding device of claim 1, wherein the stream divider divides the input bit stream so that the plurality of sub-streams each contain only one prediction unit of each of the macroblocks.

11. The image decoding device of claim 1, wherein the stream divider divides the input bit stream so that the plurality of sub-streams each include two or more prediction units of each of the macroblocks.

12. The image decoding device of claim 11, wherein
when the moving picture has the 4:2:0 chroma format and the macroblocks each include, as the plurality of prediction units, four luminance signal blocks arranged in a matrix of two rows and two columns, a blue color difference signal block, and a red color difference signal block, the stream divider outputs blocks in a first row of the luminance signal blocks as a first one of the plurality of sub-streams, blocks in a second row of the luminance signal blocks as a second one of the plurality of sub-streams, and the blue color difference signal block and the red color difference signal block as a third one of the plurality of sub-streams.

13. The image decoding device of claim 11, wherein
when the moving picture has the 4:2:2 chroma format and the macroblocks each include, as the plurality of prediction units, four luminance signal blocks arranged in a matrix of two rows and two columns, two blue color difference signal blocks arranged in a matrix of two rows and one column, and two red color difference signal blocks arranged in a matrix of two rows and one column, the stream divider outputs blocks in a first row of the luminance signal blocks as a first one of the plurality of sub-streams, blocks in a second row of the luminance signal blocks as a second one of the plurality of sub-streams, a block in a first row of the blue color difference signal blocks and a block in a first row of the red color difference signal blocks as a third one of the plurality of sub-streams, and a block in a second row of the blue color difference signal blocks and a block in a second row of the red color difference signal blocks as a fourth one of the plurality of sub-streams.

14. The image decoding device of claim 11, wherein
when the moving picture has the 4:4:4 chroma format and the macroblocks each include, as the plurality of prediction units, four luminance signal blocks arranged in a matrix of two rows and two columns, four blue color difference signal blocks arranged in a matrix of two rows and two columns, and four red color difference signal blocks arranged in a matrix of two rows and two columns, the stream divider outputs blocks in a first row of the luminance signal blocks as a first one of the plurality of sub-streams, blocks in a second row of the luminance signal blocks as a second one of the plurality of sub-streams, blocks in a first row of the blue color difference signal blocks as a third one of the plurality of sub-streams, blocks in a second row of the blue color difference signal blocks as a fourth one of the plurality of sub-streams, blocks in a first row of the red color difference signal blocks as a fifth one of the plurality of sub-streams, and blocks in a second row of the red color difference signal blocks as a sixth one of the plurality of sub-streams.

* * * * *